United States Patent
Yamahata et al.

(10) Patent No.: US 10,138,770 B2
(45) Date of Patent: Nov. 27, 2018

(54) VEHICLE AND CONTROL METHOD FOR VEHICLE

(71) Applicant: Toyota Jidosha Kabushiki Kaisha, Toyota-shi, Aichi-ken (JP)

(72) Inventors: Masami Yamahata, Toyota (JP); Akiko Nishimine, Toyota (JP); Takuya Kodama, Aichi-ken (JP); Kenji Tanabe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 24 days.

(21) Appl. No.: 15/634,709

(22) Filed: Jun. 27, 2017

(65) Prior Publication Data
US 2018/0010491 A1    Jan. 11, 2018

(30) Foreign Application Priority Data

Jul. 11, 2016 (JP) .................. 2016-137149

(51) Int. Cl.
  *F01M 1/02*    (2006.01)
  *B60K 6/365*   (2007.10)
  *B60K 6/383*   (2007.10)
  *B60K 6/442*   (2007.10)
  *B60W 20/40*   (2016.01)

(52) U.S. Cl.
  CPC ............... *F01M 1/02* (2013.01); *B60K 6/365* (2013.01); *B60K 6/383* (2013.01); *B60K 6/442* (2013.01); *B60W 20/40* (2013.01); *B60W 2530/10* (2013.01); *B60W 2530/22* (2013.01); *F01M 2001/0215* (2013.01); *Y10S 903/91* (2013.01); *Y10S 903/913* (2013.01)

(58) Field of Classification Search
  None
  See application file for complete search history.

(56) References Cited

U.S. PATENT DOCUMENTS

| | | | |
|---|---|---|---|
| 2012/0302400 A1 | 11/2012 | Wakayama et al. | |
| 2015/0051817 A1* | 2/2015 | Murata ................ | B60K 6/48 701/112 |
| 2015/0239452 A1* | 8/2015 | Iwasa .................. | B60K 6/48 701/22 |
| 2016/0176392 A1 | 6/2016 | Murata et al. | |

FOREIGN PATENT DOCUMENTS

| | | |
|---|---|---|
| JP | 2004-028332 A | 1/2004 |
| JP | 2011-185380 A | 9/2011 |
| JP | 2016-113125 A | 6/2016 |

* cited by examiner

*Primary Examiner* — Richard M Camby
(74) *Attorney, Agent, or Firm* — Dinsmore & Shohl LLP

(57) ABSTRACT

An electronic control unit stores a vehicle load at the time when the vehicle is switched into an ignition off state, stops operation of an electric oil pump when the vehicle load is small, and operates the electric oil pump when the vehicle load is large. Thus, a decrease in service life due to an increase in the number of times of the start of the electric oil pump is suppressed, and, when it is estimated that the vehicle load is large, the response of the start of a vehicle, which makes a driver experience a feeling of strangeness, is improved by starting the electric oil pump together with switching the vehicle into an ignition on state.

9 Claims, 13 Drawing Sheets

VEHICLE AND CONTROL METHOD FOR VEHICLE

CROSS-REFERENCE TO RELATED APPLICATIONS

This application claims priority to Japanese Patent Application No. 2016-137149 filed on Jul. 11, 2016 which is incorporated herein by reference in its entirety including the specification, drawings and abstract.

BACKGROUND

1. Technical Field

The disclosure relates to a vehicle including at least one electric motor as a driving force source, and a control method for a vehicle.

2. Description of Related Art

There is a well-known vehicle driving system that includes a mechanical oil pump and an electric oil pump as hydraulic pressure supply devices for a vehicle. This is, for example, a vehicle driving system described in Japanese Patent Application Publication No. 2004-28332 (JP 2004-28332 A). The vehicle driving system described in JP 2004-28332 A includes a control unit. The control unit forcibly restarts the electric oil pump when the electric oil pump is not restarted for a predetermined period after the electric oil pump has stopped as a result of fulfillment of a stop condition of the electric oil pump. The control unit sets a stop or start of the electric oil pump on the basis of the gradient of the vehicle. When the gradient is larger than or equal to a predetermined value, the control unit prohibits the electric oil pump from stopping.

SUMMARY

Incidentally, in the above-described vehicle driving system, it is possible to stably supply hydraulic pressure from the electric oil pump during operation of the vehicle. However, supply of hydraulic pressure from the electric oil pump at the time when the vehicle is switched to an ignition on state after the vehicle has been switched to an ignition off state is not considered. For this reason, in consideration of the possibility that it is not possible to supply appropriate hydraulic pressure at the time when the vehicle is switched to the ignition on state after the vehicle has been switched to the ignition off state, if the electric oil pump is always started at the time when the vehicle is set to the ignition on state, the service life of the electric oil pump may be decreased due to an increase in the number of times of the operation of the electric oil pump.

The disclosure is directed to reducing the driving of the electric oil pump by supplying hydraulic pressure only when the hydraulic pressure is required just after a restart of a drive control system at the time when the vehicle is switched to an ignition on state after the vehicle has been switched to an ignition off state, thus suppressing a decrease in the service life based on an increase in the number of times of a start of the electric oil pump.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a first embodiment of the disclosure will be described in detail with reference to the accompanying drawings.

Figure 1:
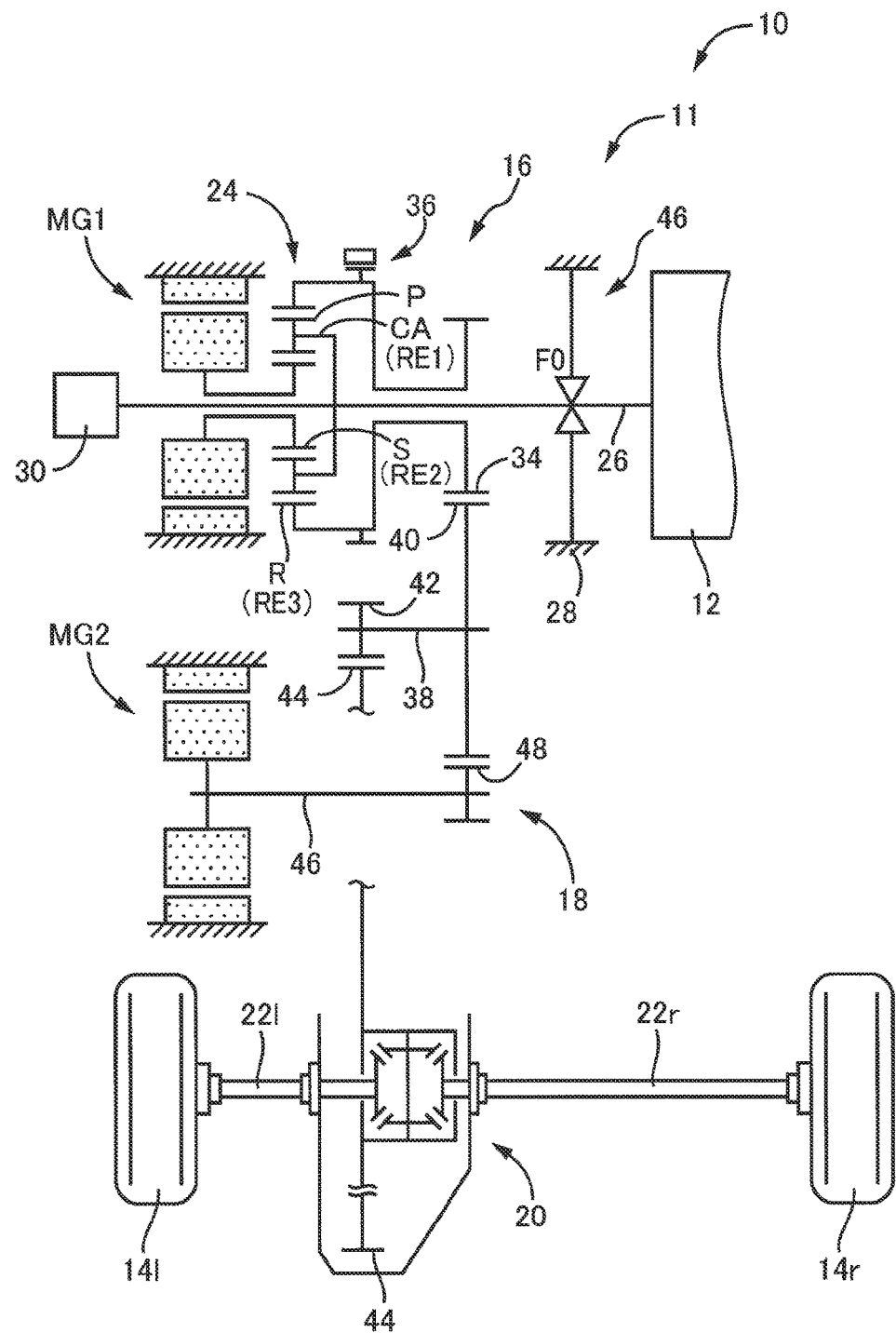
FIG. 1 is a view that illustrates the schematic configuration of a vehicle to which the disclosure is applied.

FIG. 1 is a skeletal view that illustrates the configuration of a hybrid vehicle driving system 11 (hereinafter, simply referred to as vehicle driving system 11) that is part of a vehicle 10 to which the first embodiment of the disclosure is suitably applied. The vehicle driving system 11 shown in FIG. 1 is suitably used for a front-engine front-drive (FF) vehicle. The vehicle driving system 11 includes an engine 12 that is a drive source (main power source), and a pair of right and left drive wheels 14r, 14l (hereinafter, simply referred to as drive wheels 14 unless specifically distinguished). The vehicle driving system 11 further includes mainly a first drive unit 16, a second drive unit 18, a differential gear unit 20 and a pair of right and left axles 22r, 22l (hereinafter, simply referred to as axles 22 unless specifically distinguished) in the power transmission path between the engine 12 and the drive wheels 14.

The engine 12 is, for example, an internal combustion engine, such as a gasoline engine and a diesel engine, that generates driving force through combustion of fuel that is directly injected into cylinders. The first drive unit 16 includes a planetary gear train 24 and a first electric motor MG1. The planetary gear train 24 includes a sun gear S, a carrier CA and a ring gear R that are three rotating elements. The first electric motor MG1 is coupled to the sun gear S of the planetary gear train 24. A one-way clutch F0 is provided between a crankshaft 26 and a housing (transaxle housing) 28. The crankshaft 26 is the output shaft of the engine 12. The housing 28 is a non-rotating member. The one-way clutch F0 corresponds to a lock mechanism that allows the rotation of the engine 12 in the forward direction and blocks the rotation in the reverse direction. Therefore, in two-motor EV mode, when reaction force is applied to the crankshaft 26 in order to cause not only a second electric motor MG2 but also the first electric motor MG1 to function as a drive source, the reverse rotation of the engine 12 is blocked by the one-way clutch F0. The one-way clutch F0 corresponds to the lock mechanism that blocks the reverse rotation of the crankshaft 26 that corresponds to the output shaft of the engine 12 according to the disclosure. The first electric motor MG1 and the second electric motor MG2 correspond to at least one electric motor according to the disclosure.

The crankshaft 26 of the engine 12 is coupled to the carrier CA of the planetary gear train 24. The carrier CA serves as the input rotating member of the first drive unit 16. The crankshaft 26 is coupled to a mechanical oil pump 30. The ring gear R of the planetary gear train 24 is coupled to an output gear 34. The ring gear R serves as an output rotating member. The output gear 34 is coupled to the drive wheels 14 via the second drive unit 18, the differential gear unit 20 and the axles 22 such that power is transmitted. The sun gear S of the planetary gear train 24 is coupled to the first electric motor MG1. That is, the planetary gear train 24 corresponds to a differential mechanism. The differential mechanism includes the carrier CA, the sun gear S and the ring gear R. The carrier CA is coupled to the crankshaft 26 of the engine 12, and is coupled to the one-way clutch F0. The carrier CA1 serves as a first rotating element RE1 according to the disclosure. The sun gear S is coupled to the first electric motor MG1. The sun gear S serves as a second rotating element RE2 according to the disclosure. The ring gear R is the output rotating member. The ring gear R serves as a third rotating element RE3 according to the disclosure. The ring gear R is provided with a known parking lock mechanism 36. The parking lock mechanism 36 is activated at the time when a parking range has been selected, and stops the rotation of each of the drive wheels 14 by stopping the rotation of each of the ring gear R and output gear 34. The output gear 34 is coupled to the ring gear R.

The output gear 34 is in mesh with a large-diameter gear 40. The large-diameter gear 40 is integrally provided with an intermediate output shaft 38 parallel to the crankshaft 26 that serves as the input shaft of the first drive unit 16. Similarly, a small-diameter gear 42 is integrally provided with the intermediate output shaft 38, and is in mesh with an input gear 44 of the differential gear unit 20. The large-diameter gear 40 is in mesh with a second output gear 48. The second output gear 48 is coupled to an output shaft 46 of the second electric motor MG2. The second electric motor MG2 functions as a driving electric motor. That is, the second electric motor MG2 is coupled to the drive wheels 14 such that power is transmitted. Each of the first electric motor MG1 and the second electric motor MG2 is a motor generator having the function of a motor that generates driving force and a generator that generates reaction force. The first electric motor MG1 may have at least the function of a generator. The second electric motor MG2 may have at least the function of a motor.

In the thus configured vehicle driving system 11, rotation output from the engine 12 in the first drive unit 16 is output from the output gear 34 via the planetary gear train 24 that serves as the differential mechanism. Rotation output from the engine 12 in the first drive unit 16 is input to the input gear 44 of the differential gear unit 20 via the large-diameter gear 40 provided on the intermediate output shaft 38 and the small-diameter gear 42 having a smaller number of teeth than the large-diameter gear 40. Rotation output from the output gear 34 is reduced in speed at a predetermined reduction gear ratio that is determined by the number of teeth of the large-diameter gear 40 and the number of teeth of the small-diameter gear 42, and is then input to the input gear 44 of the differential gear unit 20. The differential gear unit 20 functions as a well-known final reduction gear unit.

The rotation of the first electric motor MG1 in the first drive unit 16 is transmitted to the output gear 34 via the planetary gear train 24. The rotation of the first electric motor MG1 in the first drive unit 16 is transmitted to the input gear 44 of the differential gear unit 20 via the large-diameter gear 40 and the small-diameter gear 42 that are provided on the intermediate output shaft 38. The rotation of the second electric motor MG2 in the second drive unit 18 is transmitted via the output shaft 46 and the second output gear 48 to the large-diameter gear 40 provided on the intermediate output shaft 38. The rotation of the second electric motor MG2 in the second drive unit 18 is transmitted to the input gear 44 of the differential gear unit 20 via the large-diameter gear 40 and the small-diameter gear 42. That is, in the vehicle 10 according to the present embodiment, both the first electric motor MG1 and the second electric motor MG2 are allowed to be used as drive sources for causing the vehicle 10 to travel in the two-motor EV mode.

Figure 2:
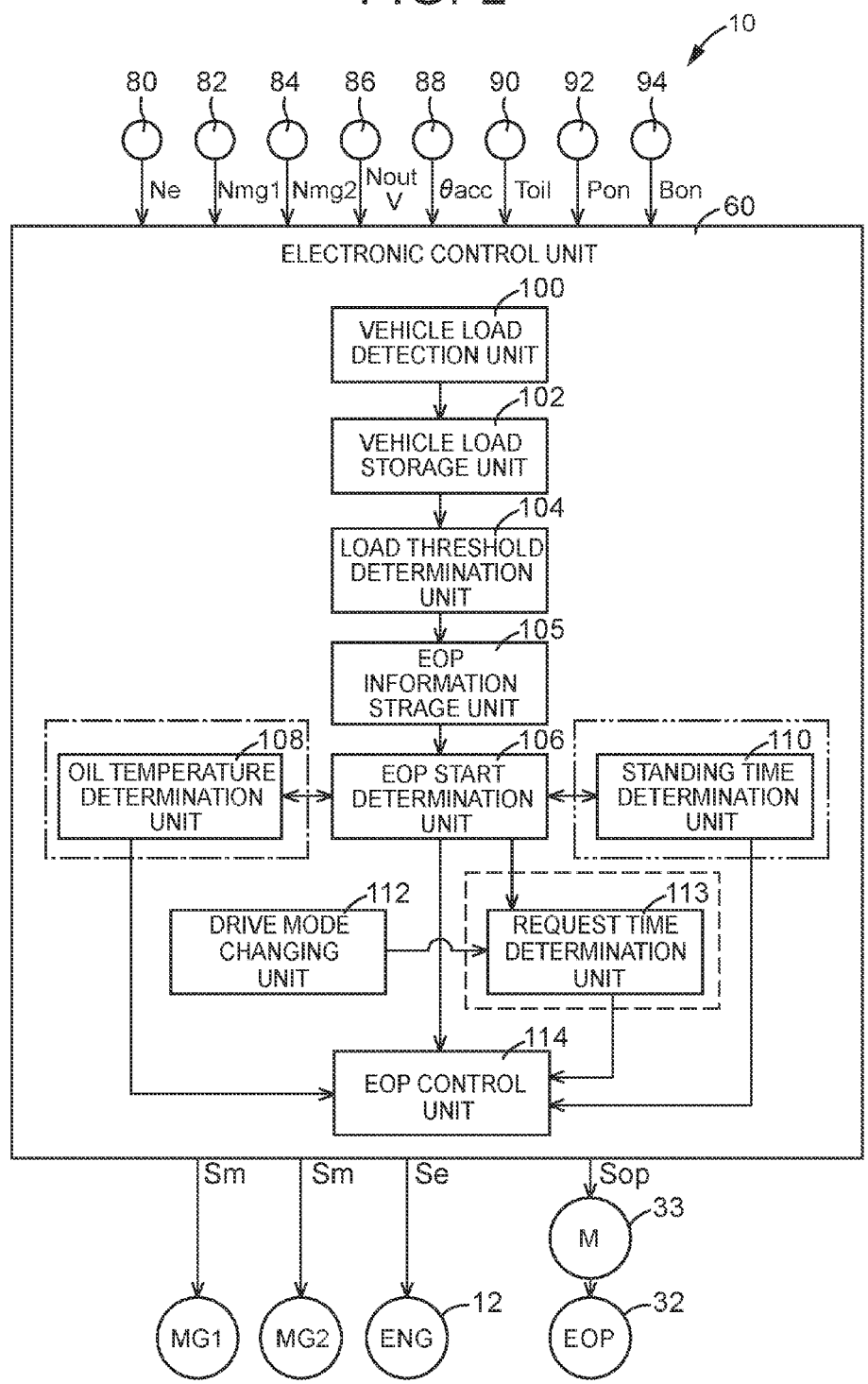
FIG. 2 is a view that illustrates a relevant portion of control functions and control system for various controls in the vehicle shown in FIG. 1.

FIG. 2 is a view that illustrates a relevant portion of electrical system provided in order to control the hybrid driving of the vehicle 10 according to the present embodiment. As shown in FIG. 2, the vehicle 10 includes a so-called microcomputer including a CPU, a ROM, a RAM, an input/output interface, and the like. The CPU executes signal processing in accordance with programs prestored in the ROM while utilizing the temporary storage function of the RAM, thus executing various controls, including hybrid drive control that uses the engine 12, the first electric motor MG1 and the second electric motor MG2.

FIG. 2 shows a functional block diagram that illustrates a relevant portion of control functions that are implemented by an electronic control unit 60 together with input signals from various sensors that are input to the electronic control unit 60 and signals that are output from the electronic control unit 60 to, for example, the first electric motor MG1, the second electric motor MG2, the engine 12, a motor 33, and the like. The motor 33 drives an electric oil pump 32. Various signals based on detected values of various sensors, and the like, provided in the vehicle 10 are supplied to the electronic control unit 60. The various sensors, and the like, include, for example, an engine rotation speed sensor 80, a first electric motor rotation speed sensor 82, a second electric motor rotation speed sensor 84, a vehicle speed sensor 86, an accelerator operation amount sensor 88, an oil temperature sensor 90, a power switch 92, a brake switch 94, and the like. The various signals include, for example, an engine rotation speed Ne (rpm), a first electric motor rotation speed Nmg1 (rpm), a second electric motor rotation speed Nmg2 (rpm), an intermediate output shaft rotation speed Nout (rpm) corresponding to a vehicle speed V (km/h), an accelerator operation amount θacc(%), an oil temperature Toil(° C.), a power on signal Pon that indicates driver's operation of the power switch 92, a Bon signal that indicates foot brake operation (on state) (not shown), and the like, are supplied to the electronic control unit 60. Various command signals are supplied from the electronic control unit 60 to the devices provided in the vehicle 10. The devices include, for example, inverters (not shown) that respectively drive the first electric motor MG1 and the second electric motor MG2, the engine 12, the motor 33 that drives the electric oil pump 32, and the like. The various command signals include, for example, an electric motor control signal Sm, an engine control signal Se, a motor control signal Sop, and the like. The electronic control unit 60 executes control such that an accessory on (Acc-on) state, an ignition on (Ig-on) state and an ignition off (Ig-off) state are repeated in this order in a toggle manner. In the accessory on state, a battery that serves as an electric power source of an electric power consumption device is connected to a system each time the power switch 92 receives a short-press push signal. In the ignition on state, the battery that serves as an electric power source for a hybrid drive system (high power consumption device) is connected by a system main relay. In the ignition off state, the system is placed in a stopped state by disconnecting the power source of the power consumption device and the power source of a power system (high power consumption device). Of these, a drive signal that serves as an on/off signal is output to an HVECU of the power system in switching the vehicle to the ignition on state or the ignition off state.

The vehicle 10 supplies power to a high power consumption device, such as an inverter that controls the power of the first electric motor MG1 and an inverter that controls the power of the second electric motor MG2, by simultaneously inputting the Bon signal indicating the operation of the foot brake and the power on signal Pon to the electronic control unit 60. When the system main relay is not in an on state, the electronic control unit 60 starts up the hybrid drive system (high power consumption device) and causes the hybrid drive system to output a ready signal by outputting an on signal to the system main relay and also outputting the ignition on (Ig-on) signal and a start signal (ST signal) to the electronic control unit 60. The ready signal indicates a vehicle travelable state. Thus, the electronic control unit 60 places the vehicle 10 in a travelable state. The vehicle 10 is able to selectively achieve an EV drive mode and an HV drive mode as a drive mode. The EV drive mode is a drive mode in which the vehicle 10 is allowed to travel by using at least one of the first electric motor MG1 and the second electric motor MG2 as a driving force source while the operation of the engine 12 is stopped. The EV drive mode includes two modes, that is, a one-motor EV mode and a two-motor EV mode. In the one-motor EV mode, the vehicle 10 performs EV driving by using only the second electric motor MG2 as a driving force source. In the two-motor EV mode, the vehicle 10 performs EV driving by using both the first electric motor MG1 and the second electric motor MG2 as driving force sources. The HV drive mode is an engine drive mode in which the vehicle 10 travels by mechanically transmitting the engine torque Te of the engine 12 to the drive wheels 14 in addition to the second electric motor MG2.

Figure 3:
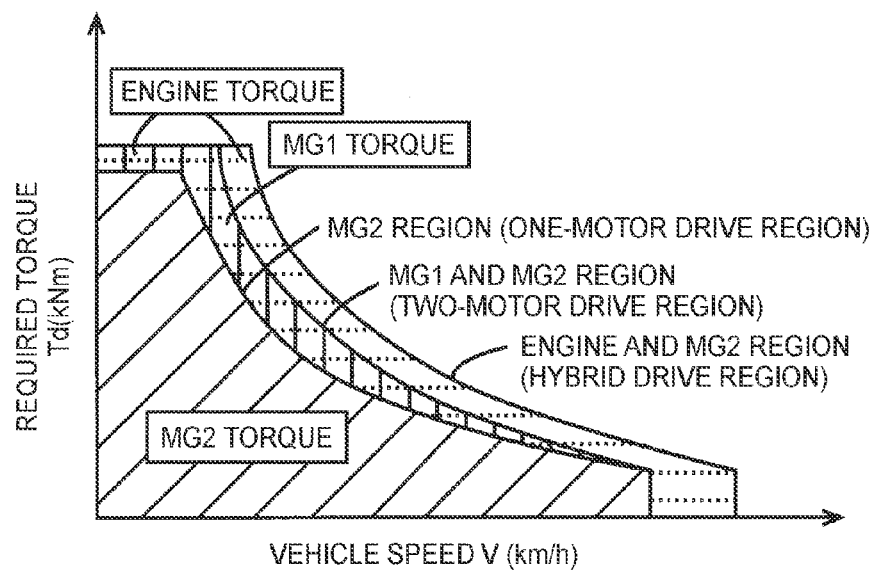
FIG. 3 is a view that shows a one-motor drive region, a two-motor drive region and a hybrid drive region for electric motors shown in FIG. 1.

FIG. 3 shows a one-motor drive region, a two-motor drive region and a hybrid drive region. In the one-motor drive region indicated by the diagonal lines, the vehicle 10 travels in first drive mode. In the two-motor drive region indicated by the vertical lines, the vehicle 10 travels in second drive mode. In the hybrid drive region indicated by dotted lines, the vehicle 10 travels in the engine drive mode. The first drive mode is the one-motor EV mode in which only the second electric motor MG2 is used as a driving force source. The second drive mode is the two-motor EV mode in which both the first electric motor MG1 and the second electric motor MG2 are used as driving force sources. Each of the one-motor EV mode and the two-motor EV mode is the EV drive mode. The engine drive mode is a mode in which the engine 12 and the second electric motor MG2 are used as driving force sources. One of the drive modes is selected on the basis of a vehicle speed V (km/h) and a required torque Td (kNm). The required torque corresponds to a vehicle load. The required torque Td is, for example, calculated on the basis of an accelerator operation amount θacc and a vehicle speed V by consulting a predetermined relationship (map).

Figure 4:
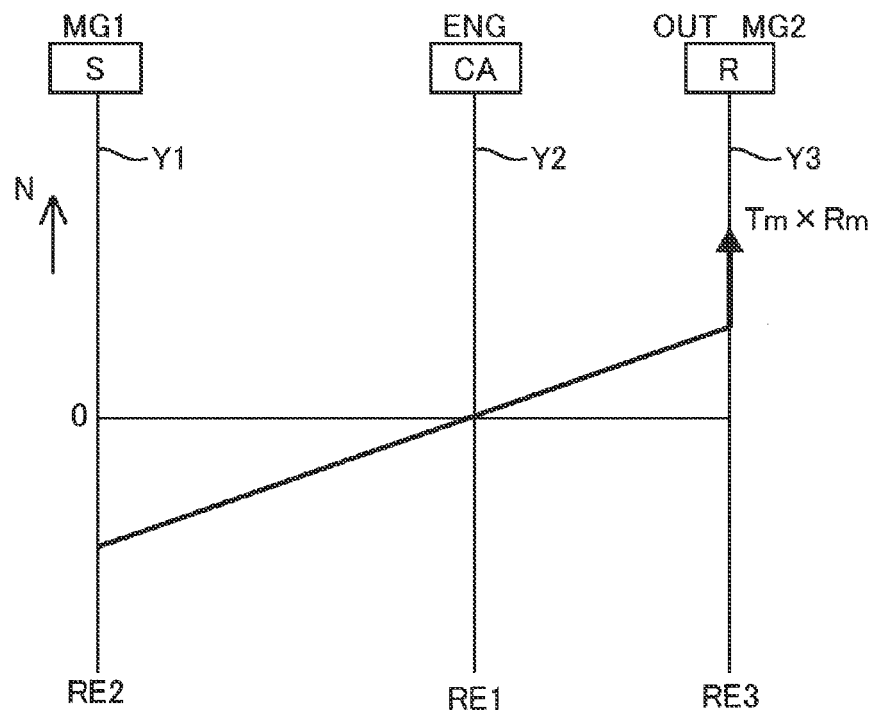
FIG. 4 is a nomograph that relatively represents the rotation speeds of three rotating elements of a planetary gear train that is a differential mechanism shown in FIG. 1, and is an example of a state in the one-motor drive region of FIG. 3.
Figure 5:
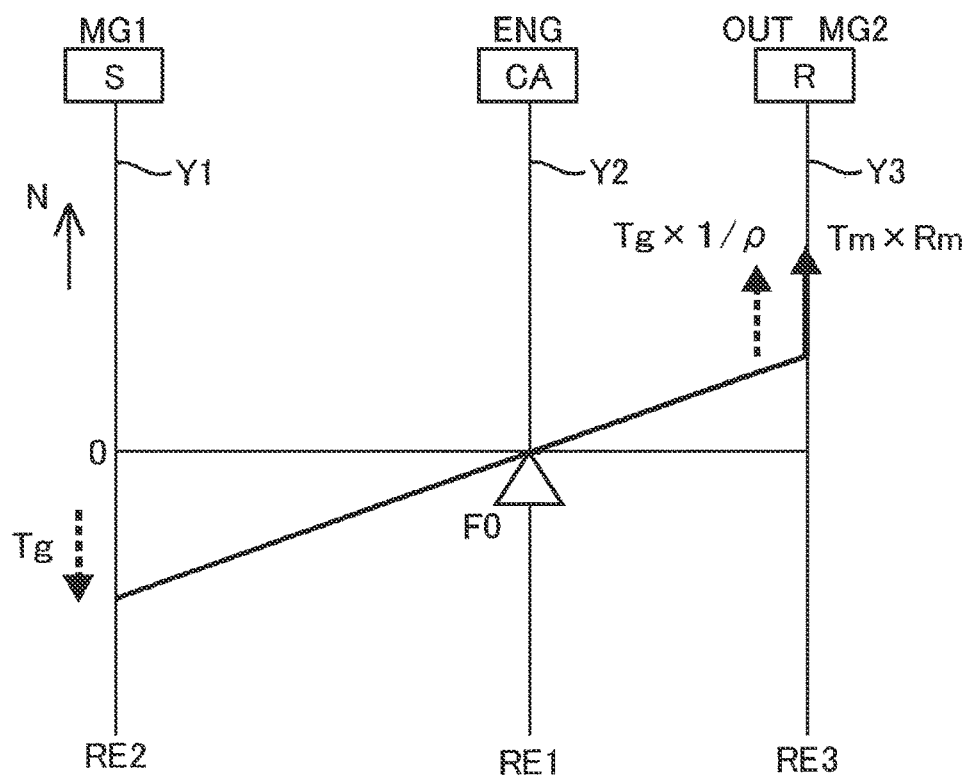
FIG. 5 is a nomograph that relatively represents the rotation speeds of the three rotating elements of the planetary gear train that is the differential mechanism shown in FIG. 1, and is an example of a state in the two-motor drive region of FIG. 3.

FIG. 4 and FIG. 5 are nomographs, each of which relatively represents the rotation speeds of the three rotating elements RE1, RE2, RE3 in the planetary gear train 24. In these nomographs, the vertical lines Y1 to Y3 that respectively represent the rotation speeds of the rotating elements of the planetary gear train 24. In order from the left side when facing toward the sheet, the vertical line Y1 represents the rotation speed of the sun gear S that is the second rotating element RE2, the vertical line Y2 represents the rotation speed of the carrier CA that is the first rotating element RE1 coupled to the engine 12, and the vertical line Y3 represents the rotation speed of the ring gear R that is the third rotating element RE3.

FIG. 4 is a nomograph in the one-motor EV mode. In the one-motor EV mode, only the second electric motor MG2 is driven, and the engine 12 or the first electric motor MG1 is not driven. The rotation speed Nmg2 of the second electric motor MG2 is indicated by the point of intersection of the vertical line Y3 with the oblique continuous line, and the rotation speed Ne of the engine 12 indicates substantially zero. The rotation speed Nmg1 of the first electric motor MG1 is reverse in direction to the rotation speed Nmg2 of the second electric motor MG2, and is the number of revolutions ($-$Nmg2$\times$1/$\rho$) obtained by multiplying the rotation speed Nmg2 by the inverse number of p (value obtained by dividing the number of teeth of the sun gear S by the number of teeth of the ring gear R). A torque in the third rotating element RE3 is a torque (Tm$\times$Rm) obtained by multiplying the torque Tm of the second electric motor MG2 by Rm. Rm is calculated from the ratio between the number of teeth of the second output gear 48 and the number of teeth of the output gear 34.

FIG. 5 is a nomograph in the two-motor EV mode. In the two-motor EV mode, the second electric motor MG2 and the first electric motor MG1 are used as drive sources for propelling the vehicle 10, and the engine 12 is not driven. The rotation speed Nmg2 of the second electric motor MG2 is indicated by the point of intersection of the vertical line Y3 with the oblique continuous line. The first electric motor MG1 rotates in a direction reverse to the second electric motor MG2. The rotation speed Nmg1 of the first electric motor MG1 is indicated by the point of intersection of the vertical line Y1 with the oblique continuous line. The number of revolutions Ne of the engine 12 is substantially zero. The engine 12 is rotatable only in the forward rotation direction that is the upper side of FIG. 5 because of the one-way clutch F0 irrespective of the rotation direction of the first electric motor MG1. A torque in the third rotating element RE3 is a total of a torque (Tm$\times$Rm) and a value (Tg$\times$1l/$\rho$). The torque (Tm$\times$Rm) is obtained by multiplying the torque Tm of the second electric motor MG2 by Rm that is calculated from the ratio of the number of teeth of the second output gear 48 and the number of teeth of the output gear 34. The value (Tg$\times$1/$\rho$) is obtained by multiplying the torque Tg of the first electric motor MG1 by the inverse number of $\rho$ (value obtained by dividing the number of teeth of the sun gear S by the number of teeth of the ring gear R). In the two-motor EV mode, the torque Tg of the first electric motor MG1 and the torque Tm of the second electric motor MG2 are used as the driving force of the vehicle 10.

The vehicle 10 includes the electric oil pump 32 and the mechanical oil pump 30. The electric oil pump 32 is driven by the motor 33. The mechanical oil pump 30 is driven by the engine 12. In the one-motor EV mode that is used when the required torque Td, that is, the vehicle load, is small, the electric oil pump 32 is not operated in a normal state. In the two-motor EV mode in which the required torque Td is larger than that in the one-motor EV mode, the electric oil pump 32 is operated, and oil is supplied to pinion gears P, and the like, that can be subjected to poor lubrication at a high rotation speed.

However, at the time of switching the vehicle 10 from the ignition off state to the ignition on state and causing the vehicle 10 to start moving, when it is determined that the two-motor EV mode is required because of a large vehicle load Td, the drive mode cannot be immediately changed into the two-motor EV mode. For example, when oil around the pinion gears P is not ensured, the drive mode cannot be immediately changed into the two-motor EV mode. In this case, the dive mode is changed into the two-motor EV mode via the operation of the one-motor EV mode and the operation of the electric oil pump 32 or changed into the HV mode via the operation of the one-motor EV mode. When the drive mode is changed into the two-motor EV mode via the operation of the one-motor EV mode and the operation of the electric oil pump 32, it takes a long time until the required torque Td is satisfied. For this reason, in order to shorten the time that is taken until the required torque Td is satisfied, if the electric oil pump 32 is always operated in causing the vehicle 10 to start moving in the ignition on state, the durability of the electric oil pump 32 may decrease. When the drive mode is changed into the HV mode via the operation of the one-motor EV mode, the frequency of startup of the engine 12 increases. This may decrease fuel consumption.

Referring back to FIG. 2, the electronic control unit 60 includes a vehicle load detection unit 100, a vehicle load storage unit 102, a load threshold determination unit 104, an EOP information storage unit 105, an EOP start determination unit 106, an oil temperature determination unit 108, a standing time determination unit 110, a drive mode changing unit 112, a request time determination unit 113 and an EOP control unit 114. The drive mode changing unit 112 selects any one of the first drive mode and the second drive mode. The second drive mode is a mode in which driving force that is output from the electric motors is larger than driving force that is output from the electric motor in the first drive mode.

The vehicle load detection unit 100, for example, repeatedly detects the vehicle load Td during traveling of the vehicle 10 in a steady state at predetermined intervals on the basis of an accelerator operation amount $\theta$acc and a vehicle speed V by consulting a predetermined relationship (map). The vehicle load storage unit 102, for example, stores a unit time amount of data of the vehicle load Td detected per unit time by the vehicle load detection unit 100. The stored data of the vehicle load Td may be, for example, sequentially rewritten to new data of the vehicle load Td after a lapse of a predetermined time. As the ignition off signal Ig-off is output from the power switch 92, the load threshold determination unit 104 determines whether the vehicle load Td stored in the vehicle load storage unit 102 exceeds a preset vehicle load threshold A. An average, or the like, of the stored data of the vehicle load Td may be, for example, employed as the vehicle load Td that is compared with the vehicle load threshold A. When the average of the stored data of the vehicle load Td exceeds the preset vehicle load threshold A, the load threshold determination unit 104 determines that it is required to start the EOP, that is, the electric oil pump 32, at the time when the vehicle 10 is switched from the ignition off state to the ignition on state next time. When the load threshold determination unit 104 determines that it is required to start the electric oil pump 32, the load threshold determination unit 104 sets an EOP required flag, and causes the EOP information storage unit 105 to store information that it is required to start the EOP. When the average is smaller than or equal to the preset vehicle load threshold A, the load threshold determination unit 104 determines that it is not required to start the electric oil pump 32 at the time when the vehicle 10 is switched from the ignition off state to the ignition on state. When the load threshold determination unit 104 determines that it is not required to start the electric oil pump 32, the load threshold determination unit 104 resets the EOP required flag, and causes the EOP information storage unit 105 to store information that it is not required to start the EOP. In this embodiment, the average of the stored data of the vehicle load Td is compared with the vehicle load threshold A. However, particularly, a value to be compared with the vehicle load threshold A is not limited to the average of the data of the vehicle load Td. For example, a value to be compared with the vehicle load threshold A may be any vehicle load data by which it is possible to determine an increase in the vehicle load Td resulting from a stop of the vehicle 10 on a road surface having a gradient.

As a driver switches the vehicle 10 from the ignition off state to the ignition on state and the ignition on signal Ig-on is output from the power switch 92, the EOP start determination unit 106 reads the information stored in the EOP information storage unit 105. When the EOP start determination unit 106 determines that it is required to start the electric oil pump 32, the EOP start determination unit 106 sets the EOP required flag, and the EOP control unit 114 starts the electric oil pump 32. The EOP start determination unit 106 reads the information stored in the EOP information storage unit 105. When the EOP start determination unit 106 determines that it is not required to start the electric oil pump 32, the EOP start determination unit 106 does not drive the electric oil pump 32 in the one-motor EV mode, and drives the electric oil pump 32 only in the two-motor EV mode.

Figure 6:
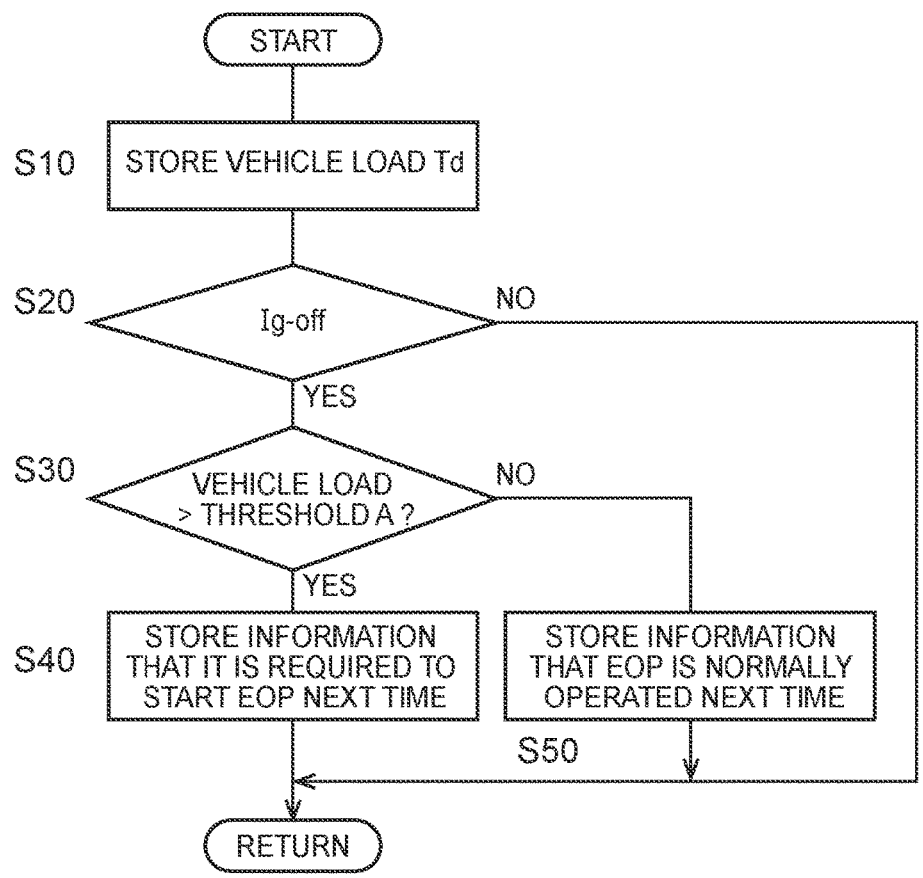
FIG. 6 is a flowchart that shows a relevant portion of control operations to which a first embodiment of the disclosure is applied, that is, control operations for setting whether to start an electric oil pump at the time of the next start of a driving force source on the basis of the driving force of the driving force source before the vehicle is switched from an ignition on state to an ignition off state.
Figure 7:
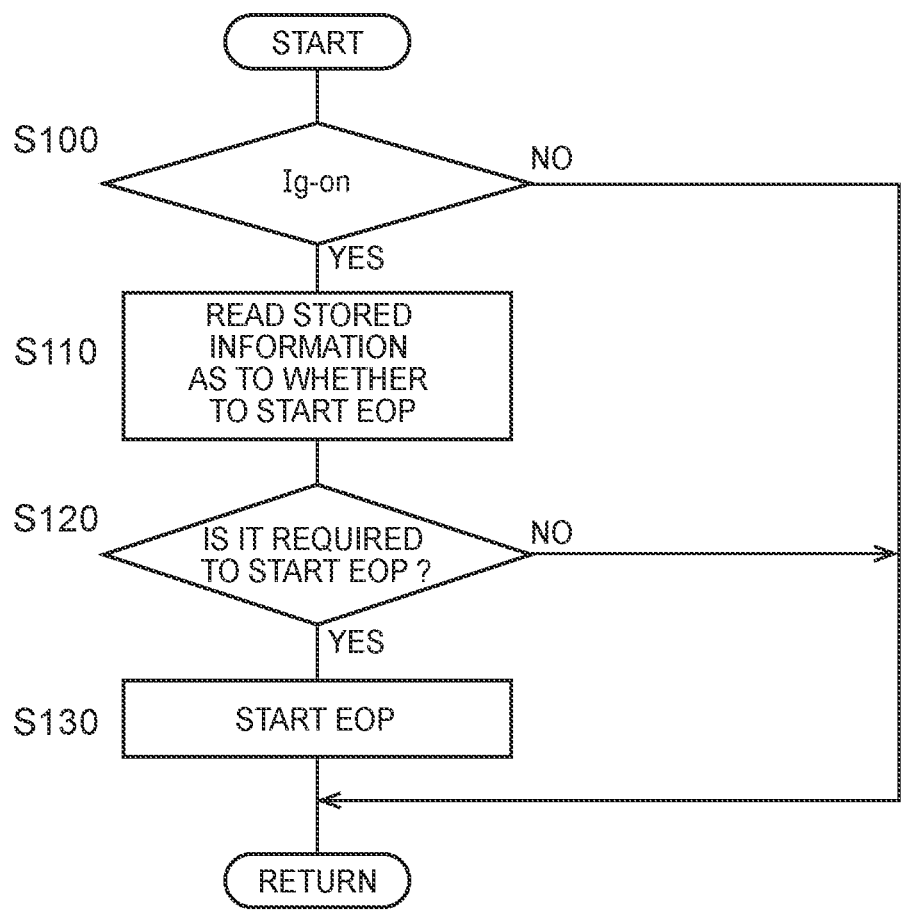
FIG. 7 is a flowchart that shows a relevant portion of control operations to which the first embodiment of the disclosure is applied, that is, control operations for setting whether to start the electric oil pump after the vehicle has been switched from the ignition off state to the ignition on state.

FIG. 6 is a flowchart that shows a relevant portion of control operations of the electronic control unit 60, that is, a flowchart for storing a vehicle load Td during traveling of the vehicle 10 before switching the vehicle 10 from the ignition on state to the ignition off state. For example, this flowchart is repeatedly executed with a control cycle of more than a dozen milliseconds to several tens of milliseconds. FIG. 7 shows control operations for starting the electric oil pump 32 before startup of the second electric motor MG2 only when the latest vehicle load Td among the vehicle loads Td repeatedly stored at, for example, each control cycle in the last ignition off state is larger than the predetermined threshold A at the time when the vehicle 10 is switched from the ignition off state to the ignition on state, that is, when the vehicle 10 is restarted. Thus, FIG. 7 is a flowchart that illustrates control operations for suppressing a decrease in service life due to an increase in the number of start operations of the electric oil pump 32 by restricting the driving of the electric oil pump 32 in comparison with the case where the electric oil pump 32 is always driven at the time when the vehicle 10 is switched from the ignition off state to the ignition on state. This flowchart is repeatedly executed.

In FIG. 6, in step 10 (hereinafter, step is omitted) corresponding to the function of the vehicle load storage unit 102, a vehicle load Td is stored. When the ignition off signal Ig-off is generated in response to re-depressing operation of the power switch 92 in S20 corresponding to the function of the load threshold determination unit 104, it is determined in S30 corresponding to the function of the load threshold determination unit 104 whether the vehicle load Td during traveling of the vehicle 10 before the vehicle 10 is switched from the ignition on state to the ignition off state, detected by the vehicle load detection unit 100 and stored by the vehicle load storage unit 102, exceeds the threshold A. When affirmative determination is made in S30, that is, when it is estimated that the vehicle load Td at the next startup of the vehicle 10 is large, it is determined in S30 corresponding to the function of the load threshold determination unit 104 to start the electric oil pump 32 at the time when the vehicle 10 is switched from the ignition off state to the ignition on state next time. Then, in S40 corresponding to the function of the EOP information storage unit 105, information that the electric oil pump 32 is started is stored at the time when the vehicle 10 is switched from the ignition off state to the ignition on state next time. When negative determination is made in S30, that is, when it is estimated that the vehicle load Td at the startup of the vehicle 10 is not so large, information that the electric oil pump 32 is not started and the electric oil pump 32 is operated normally at the time when the vehicle 10 is switched from the ignition off state to the ignition on state next time is stored in S50 corresponding to the function of the EOP information storage unit 105. In FIG. 7, when it is determined in S100 corresponding to the function of the EOP start determination unit 106 that the ignition on signal Ig-on is generated as a result of depressing operation of the power switch 92 when brake operation is performed, the determined information stored in the EOP information storage unit 105 at the time when the vehicle 10 has been switched into the ignition off state last time is read in S110 corresponding to the function of the EOP start determination unit 106. When it is determined in S120 corresponding to the function of the EOP start determination unit 106 that it is required to start the electric oil pump 32 on the basis of the determined information, the electric oil pump 32 is started in S130 corresponding to the function of the EOP control unit 114. When it is determined in S120 corresponding to the function of the EOP start determination unit 106 that it is not required to start the electric oil pump 32 on the basis of the determined information, a stop of the electric oil pump 32 is continued.

As for supply of hydraulic pressure from the electric oil pump 32 at the time when the vehicle 10 is switched into the ignition on state after the vehicle 10 has been switched into the ignition off state, in consideration of the possibility that it is not possible to supply oil in the case of a large vehicle load Td, when the electric oil pump 32 is always started at the time when the vehicle 10 is switched into the ignition on state, the service life of the electric oil pump 32 may be decreased due to an increase in the number of operations of the electric oil pump 32. However, according to the present embodiment, when the vehicle load Td before the vehicle 10 is switched from the ignition on state to the ignition off state last time is smaller than or equal to the threshold A, the operation of the electric oil pump 32 is stopped and the one-motor EV mode is selected at the time when the vehicle 10 is switched into the ignition on state next time. Thus, unnecessary operation of the electric oil pump 32 is reduced in comparison with the case where the electric oil pump 32 is operated each time when the vehicle 10 is switched from the ignition on state to the ignition off state. As a result, it is possible to suppress a decrease in durability due to an increase in the number of operations and operating time of the electric oil pump 32. When the vehicle load Td before the vehicle 10 is switched from the ignition on state to the ignition off state last time exceeds the threshold A, that is, when there is a high possibility of occurrence of a vehicle load Td that exceeds the threshold A even after the vehicle 10 has been switched into the ignition on state, it is allowed to immediately change the drive mode into the two-motor EV mode by starting the electric oil pump 32 at the time when the vehicle 10 is switched from the ignition on state to the ignition off state. Thus, in comparison with the case where the electric oil pump 32 is not started at the time when the vehicle 10 is switched into the ignition on state, that is, the drive mode is changed into the two-motor EV mode via the operation of the one-motor EV mode and the operation of the electric oil pump 32, a time that is taken until the required torque Td is satisfied is shortened. Therefore, it is possible to improve the response of the start of the vehicle 10, which may make the drive experience a feeling of strangeness.

In S100, it is determined that the hybrid drive system is started up only on the basis of generation of the ignition on signal Ig-on. Incidentally, the ignition on signal Ig-on is generated as a result of depressing operation of the power switch 92 twice when no brake operation is performed; however, the frequency of such operation is extremely low, so a sufficient advantageous effect is obtained even when it is determined that the hybrid drive system is started up only on the basis of generation of the ignition on signal Ig-on.

The first embodiment of the disclosure is described in detail with reference to the accompanying drawings; however, the disclosure is also applied to other embodiments.

In the above-described embodiment, the first electric motor MG1 and the second electric motor MG2 are provided, and the one-motor EV mode in which only the second electric motor MG2 is driven and the high-power two-motor EV mode in which both the first electric motor MG1 and the second electric motor MG2 are driven are changed to each other; however, it is not particularly necessary to provide two electric motors. For example, at the time when the vehicle 10 is switched from the ignition off state to the ignition on state, that is, at the startup of the vehicle 10, one electric motor may be used, and the electric motor may be started with any one of a first drive mode and a high-power second drive mode being selected.

In the above-described embodiment, the vehicle load Td is determined on the basis of an accelerator operation amount θacc and a vehicle speed V by consulting the map. Instead, the vehicle load detection unit 100 does not simply measure the vehicle load Td but, for example, may detect at least one of the road surface gradient, shipping weight and towing load of the vehicle 10. For example, the road surface gradient of the vehicle 10 may be detected with the use of a gravity sensor, or the like, and, when the road surface gradient is higher than or equal to a predetermined road surface gradient, it may be determined to start the electric oil pump 32 just after the vehicle 10 has been switched from the ignition on state to the ignition off state. The shipping weight or the towing load before the vehicle 10 is switched into the ignition off state may be determined by some method, and it may be determined to start the electric oil pump 32 just after the vehicle 10 has been switched from the ignition on state to the ignition off state.

In the above-described embodiment, when the ignition off signal Ig-off is output from the power switch 92, the load threshold determination unit 104 determines whether the vehicle load Td stored in the vehicle load storage unit 102 exceeds the preset vehicle load threshold A, and sets and stores the EOP required flag. However, not the determination is particularly made after the ignition off signal Ig-off is output, but, for example, S30 of FIG. 6 may be transferred to between S110 and S120 of FIG. 7, and the EOP required flag may be set by determining whether the vehicle load Td stored in the vehicle load storage unit 102 exceeds the preset vehicle load threshold A at the time when the ignition on signal Ig-on is output after the ignition off signal Ig-off has been output.

In the vehicle driving system 11 according to the above-described embodiment, the second electric motor MG2 is arranged along a rotation axis different from the rotation axis of the first electric motor MG1. Instead, these first electric motor MG1 and second electric motor MG2 may be arranged along the same axis.

The sun gear S of the planetary gear train 24 is coupled to the first electric motor MG1, the carrier CA is coupled to the engine 12 and the ring gear R is coupled to the second electric motor MG2 such that power is transmitted; however, this coupling relationship is one example, and may be modified as needed without contradiction. In the above-described embodiment, the planetary gear train 24 is used as the differential mechanism; however, the planetary gear train 24 may be replaced with any component that is able to provide differential action, such as a bevel gear.

In the above-described embodiment, the one-way clutch F0 that blocks rotation in the reverse direction is provided between the crankshaft 26 that is the output shaft of the engine 12 and the housing 28 that is the non-rotating member; however, a mechanism that blocks rotation in the reverse direction is not specifically limited to the one-way clutch F0. For example, a mechanism that blocks rotation in the reverse direction may be any mechanism that is able to block rotation in the reverse direction, such as a reverse rotation prevention brake.

Next, a second embodiment of the disclosure will be described. In the following description, like reference numerals denote portions common to those in the above-described embodiment, and the description thereof is omitted.

In the present embodiment, detection of a vehicle load Td during traveling of the vehicle 10 by the vehicle load detection unit 100, determination as to whether to start the electric oil pump 32 by the EOP start determination unit 106, and start of the electric oil pump 32 at the time when the vehicle 10 is switched into the ignition on state by the EOP control unit 114 in FIG. 2 are the same as those of the above-described first embodiment. In the present embodiment, after the EOP start determination unit 106 determines to start the electric oil pump 32, the request time determination unit 113 surrounded by the dashed line in FIG. 2 determines whether a command to change the drive mode into the two-motor drive mode is output from the drive mode changing unit 112 within a predetermined time ta (sec), and, unless a two-motor drive request is output within the predetermined time ta, the EOP control unit 114 stops starting the electric oil pump 32 until the two-motor drive request is issued.

Figure 8:
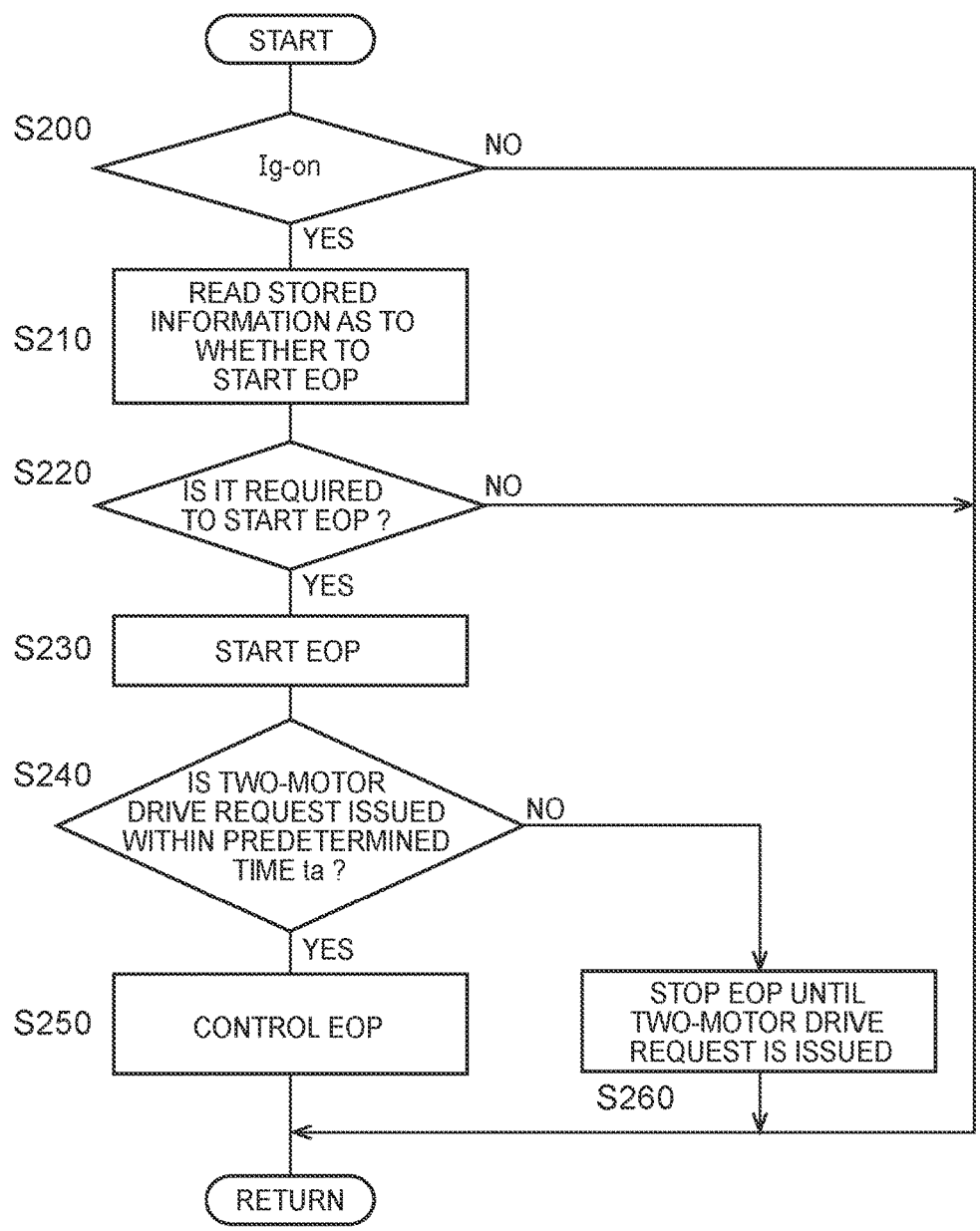
FIG. 8 is a flowchart that shows a relevant portion of control operations to which a second embodiment of the disclosure is applied, that is, control operations for stopping the driving of the electric oil pump unless a two-motor drive request is issued after the control operations shown in FIG. 7.

FIG. 8 is a flowchart that illustrates the above-described control operations. This flowchart is repeatedly executed. In FIG. 8, when it is determined in S200 corresponding to the function of the EOP start determination unit 106 that the ignition on signal Ig-on is generated as a result of depressing operation of the power switch 92 when brake operation is performed, the determined information stored in the EOP information storage unit 105 at the time when the vehicle 10 has been switched into the ignition off state last time is read in S210 corresponding to the function of the EOP start determination unit 106. When it is determined in S220 corresponding to the function of the EOP start determination unit 106 that it is not required to start the electric oil pump 32 on the basis of the determined information, control over the electric oil pump 32 is changed to normal control. When it is determined that it is required to start the electric oil pump 32 on the basis of the determined information, the electric oil pump 32 is started in S230 corresponding to the function of the EOP control unit 114. In S240 corresponding to the function of the request time determination unit 113 surrounded by the dashed line in FIG. 2, it is determined whether the two-motor drive request is issued within the predetermined time ta after the electric oil pump 32 has been started. When affirmative determination is made in S240, the driving of the electric oil pump 32 is continued in S250 corresponding to the function of the EOP control unit 114. When negative determination is made in S240, the driving of the electric oil pump 32 is stopped in S260 corresponding to the function of the EOP control unit 114 until the two-motor drive request is issued.

According to the present embodiment, when the vehicle load Td before the vehicle 10 is switched from the ignition on state to the ignition off state last time is smaller than or equal to the threshold A, the operation of the electric oil pump 32 is stopped at the time when the vehicle 10 is switched into the ignition on state next time. In addition, in comparison with the case where the electric oil pump 32 is operated each time when the vehicle 10 is switched from the ignition on state to the ignition off state, unnecessary operation of the electric oil pump 32 is reduced by selecting the one-motor EV mode, so it is possible to suppress a decrease in durability due to an increase in the number of times of operation and operating time of the electric oil pump 32. When the vehicle load Td before the vehicle 10 is switched from the ignition on state to the ignition off state last time exceeds the threshold A, that is, when there is a high possibility that the vehicle load Td that exceeds the threshold A is generated even after the vehicle 10 has been switched into the ignition on state, it is allowed to immediately change the drive mode into the two-motor EV mode by starting the electric oil pump 32 at the time when the vehicle 10 is switched from the ignition on state to the ignition off state. Therefore, it is possible to improve the response of the start of the vehicle 10, which may make the driver experience a feeling of strangeness. When it is not required to start the electric oil pump 32 within the predetermined time ta, the driving of the electric oil pump 32 is stopped. Therefore, it is possible to reduce the electric power consumption of the electric oil pump 32.

A third embodiment of the disclosure will be described. In the following description, like reference numerals denote portions common to those in the above-described embodiments, and the description thereof is omitted.

The present embodiment is an embodiment that adds control operations based on oil temperature determination made by the oil temperature determination unit 108 surrounded by the alternate long and short dashed line in FIG. 3 to the control operations according to the above-described first embodiment. Specifically, when the EOP start determination unit 106 determines that it is required to start the electric oil pump 32 after the vehicle 10 has been switched from the ignition off state to the ignition on state, and when the oil temperature determination unit 108 determines that the oil temperature Toil exceeds a threshold B(° C.), the EOP control unit 114 starts the electric oil pump 32. When the oil temperature determination unit 108 determines that the oil temperature Toil is lower than or equal to the threshold B, the oil temperature determination unit 108 causes the EOP control unit 114 to stop starting the electric oil pump 32 until the oil temperature Toil exceeds the threshold B. When the oil temperature Toil exceeds the threshold B, the oil temperature determination unit 108 normally operates the electric oil pump 32, that is, permits the operation of the electric oil pump 32.

Figure 9:
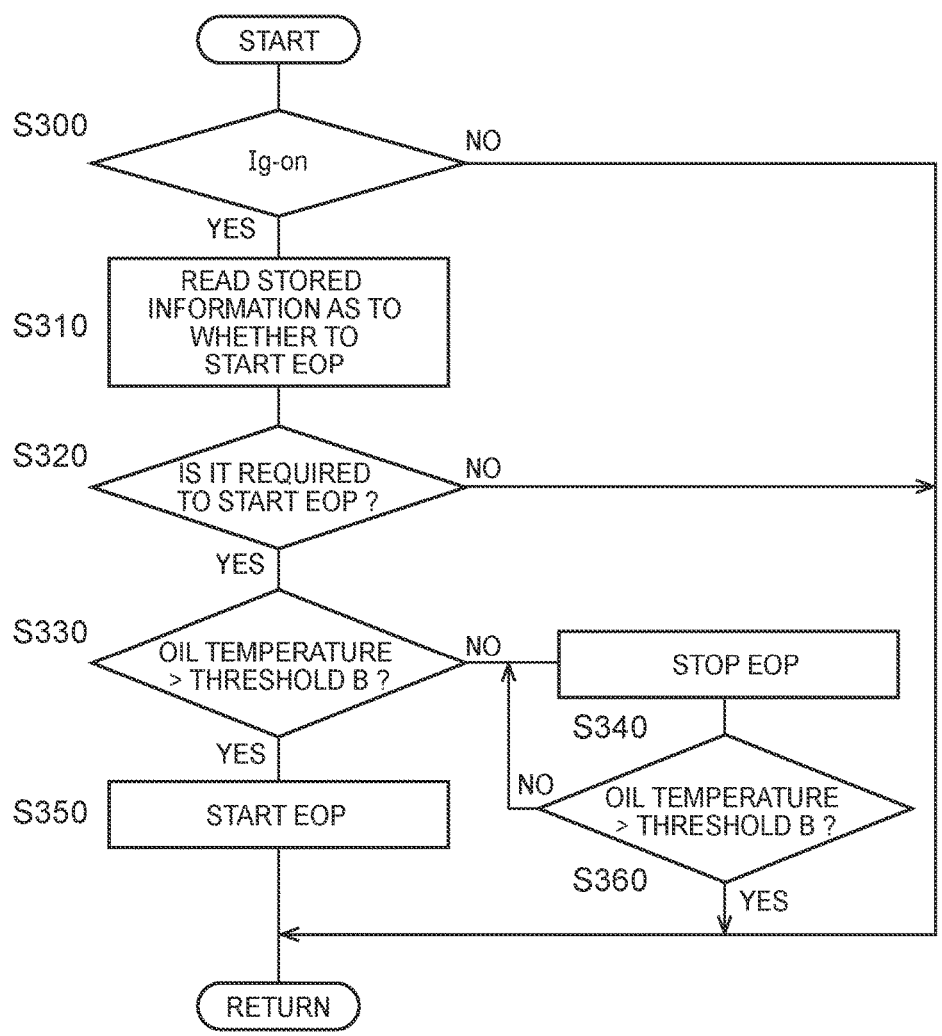
FIG. 9 is a flowchart that shows a relevant portion of control operations to which a third embodiment of the disclosure is applied, that is, control operations for determining whether to drive the electric oil pump on the basis of an oil temperature after it is determined to start the electric oil pump in FIG. 7.

FIG. 9 is a flowchart that illustrates the above-described control operations. This flowchart is repeatedly executed. In FIG. 9, when it is determined in S300 corresponding to the function of the EOP start determination unit 106 that the ignition on signal Ig-on is generated as a result of depressing operation of the power switch 92 when brake operation is performed, the determined information stored in the EOP information storage unit 105 at the time when the vehicle 10 has been switched into the ignition off state last time is read in S310 corresponding to the function of the EOP start determination unit 106. When it is determined in S320 corresponding to the function of the EOP start determination unit 106 that it is not required to start the electric oil pump 32 on the basis of the determined information, control over the electric oil pump 32 is changed to normal control. When it is determined that it is required to start the electric oil pump 32 on the basis of the determined information, it is determined in S330 corresponding to the function of the oil temperature determination unit 108 surrounded by the alternate long and short dashed line in FIG. 2 whether the oil temperature Toil exceeds the threshold B. When affirmative determination is made in S330, the electric oil pump 32 is started in S350 corresponding to the function of the EOP control unit 114. When negative determination is made in S330, a stop of the electric oil pump 32 is continued in S340 corresponding to the function of the EOP control unit 114, and it is determined in S360 corresponding to the function of the oil temperature determination unit 108 whether the oil temperature Toil exceeds the threshold B. This determination is repeated until the oil temperature Toil exceeds the threshold B. That is, the electric oil pump 32 is stopped until the oil temperature Toil exceeds the threshold B, and, when the oil temperature Toil exceeds the threshold B, the operation of the electric oil pump 32 is set to normal operation. The threshold B of the oil temperature Toil in S330 and the threshold B of the oil temperature Toil in S360 are not necessarily the same temperature, and different thresholds may be used within the range in which there is no obstacle to supply oil to the pinion gears P, and the like.

The present embodiment differs from the above-described first embodiment in that, even when it is determined that it is required to start the electric oil pump 32, but the electric oil pump 32 is started only when the oil temperature determination unit 108 determines that the oil temperature Toil exceeds the threshold B, and the operation of the electric oil pump 32 is stopped until the oil temperature Toil exceeds the threshold B when the oil temperature determination unit 108 determines that the oil temperature Toil is lower than or equal to the threshold B. Therefore, as in the case of the first embodiment, when the vehicle load Td before the vehicle 10 is switched from the ignition on state to the ignition off state is smaller than or equal to the threshold A, the operation of the electric oil pump 32 is stopped and the one-motor EV mode is selected at the time when the vehicle 10 is switched into the ignition on state next time. Thus, unnecessary operation of the electric oil pump 32 is reduced in comparison with the case where the electric oil pump 32 is operated each time when the vehicle 10 is switched from the ignition on state to the ignition off state. As a result, it is possible to suppress a decrease in durability due to an increase in the number of times of operation and operating time of the electric oil pump 32. When the vehicle load Td before the vehicle 10 is switched from the ignition on state to the ignition off state last time exceeds the threshold A, that is, when there is a high possibility that the vehicle load Td that exceeds the threshold A is generated even after the vehicle 10 has been switched into the ignition on state, it is allowed to immediately change the drive mode into the two-motor EV mode by starting the electric oil pump 32 at the time when the vehicle 10 is switched from the ignition on state to the ignition off state. Therefore, it is possible to improve the response of the start of the vehicle, which may make the driver experience a feeling of strangeness. According to the present embodiment, it is possible to suppress the degradation of the electric oil pump 32 by driving the electric oil pump 32 in a state where the oil temperature Toil exceeds the threshold B, that is, the viscosity of oil is low.

A fourth embodiment of the disclosure will be described. In the following description, like reference numerals denote portions common to those in the above-described embodiments, and the description thereof is omitted.

The present embodiment provides control operations obtained by adding the control operations according to the second embodiment to the control operations according to the third embodiment. Specifically, in the third embodiment, when the oil temperature determination unit 108 determines that the oil temperature Toil exceeds the threshold B, the EOP start determination unit 106 starts the electric oil pump 32. The request time determination unit 113 determines whether the two-motor drive request is issued within the predetermined time ta after the electric oil pump 32 has been started. When affirmative determination is made, the EOP control unit 114 continues the driving of the electric oil pump 32. When negative determination is made, the EOP control unit 114 stops the driving of the electric oil pump 32 until the two-motor drive request is issued.

Figure 10:
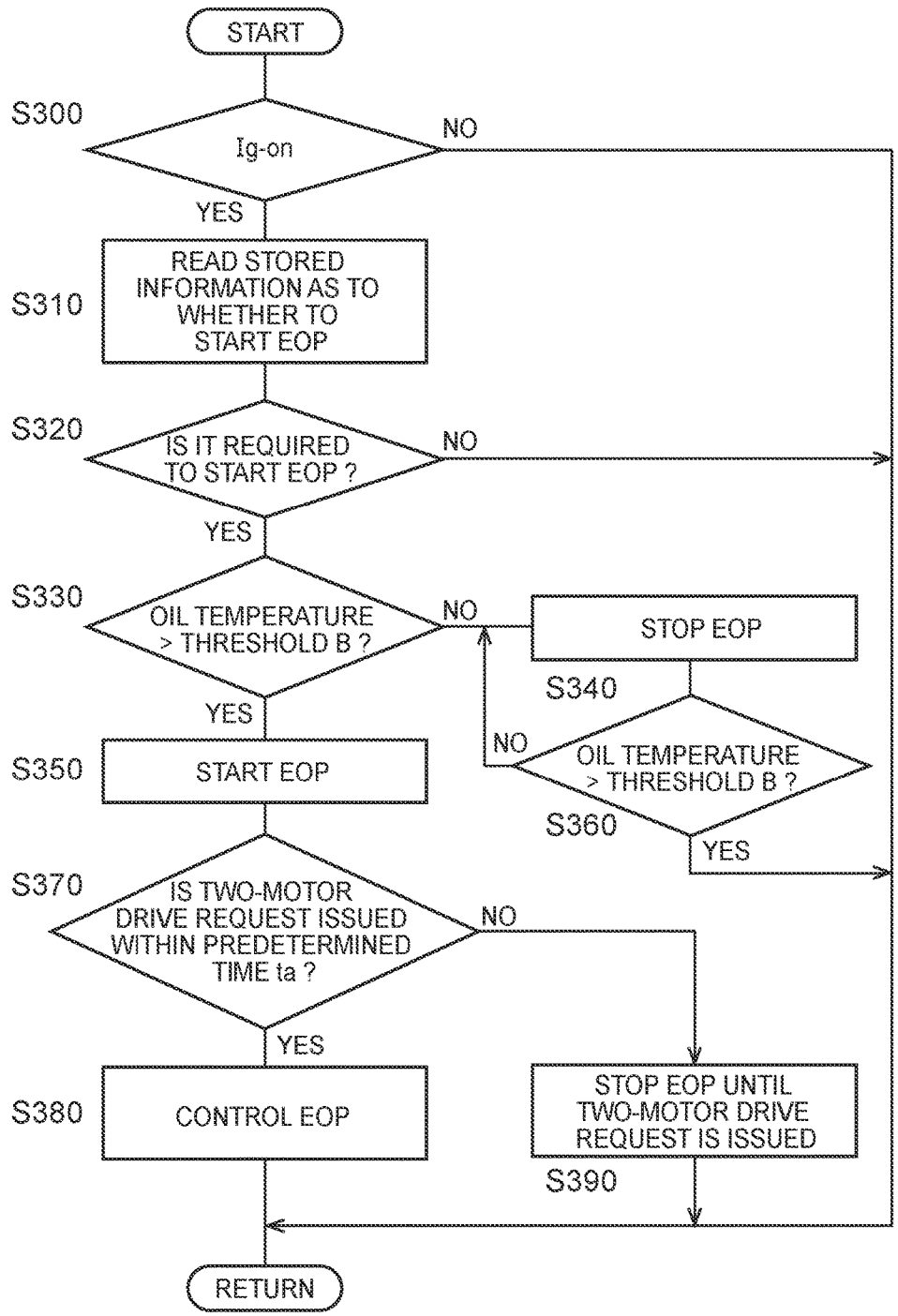
FIG. 10 is a view that shows a relevant portion of control operations to which a fourth embodiment of the disclosure is applied, that is, control operations for stopping the driving of the electric oil pump unless a two-motor drive request is issued after the control operations shown in FIG. 9.

FIG. 10 is a flowchart that illustrates the above-described control operations. This flowchart is repeatedly executed. S300 to S360 in FIG. 10 are the same as those of FIG. 9 that shows the third embodiment, so the description thereof is omitted. In S370 corresponding to the function of the request time determination unit 113 surrounded by the dashed line in FIG. 2, it is determined whether the two-motor drive request is issued within the predetermined time ta after the electric oil pump 32 has been started. When affirmative determination is made in S370, the driving of the electric oil pump 32 is continued in S380 corresponding to the function of the EOP control unit 114. When negative determination is made in S370, the driving of the electric oil pump 32 is stopped in S390 corresponding to the function of the EOP control unit 114 until the two-motor drive request is issued.

According to the present embodiment, as in the case of the third embodiment, when the vehicle load Td before the vehicle 10 is switched from the ignition on state to the ignition off state is smaller than or equal to the threshold A, the operation of the electric oil pump 32 is stopped, and the one-motor EV mode is selected. Thus, unnecessary operation of the electric oil pump 32 is reduced. As a result, it is possible to suppress a decrease in durability due to an increase in the number of times of operation and operating time of the electric oil pump 32. When the vehicle load Td exceeds the threshold A, it is allowed to immediately change the drive mode into the two-motor EV mode by starting the electric oil pump 32, so it is possible to improve the response of the start of the vehicle 10, which may make the driver experience a feeling of strangeness. In addition, it is possible to suppress the degradation of the electric oil pump by driving the electric oil pump 32 in a state where the oil temperature Toil exceeds the threshold B, that is, the viscosity of oil is low. According to the present embodiment, when it is not required to start the electric oil pump 32 within the predetermined time ta, the driving of the electric oil pump 32 is stopped. As a result, it is possible to reduce the electric power consumption of the electric oil pump 32.

Next, a fifth embodiment of the disclosure will be described. In the following description, like reference numerals denote portions common to those in the above-described embodiments, and the description thereof is omitted.

The present embodiment is obtained by adding control operations of the standing time determination unit 110 surrounded by the alternate long and two-short dashed line in FIG. 3 to the control operations according to the above-described first embodiment. Specifically, when the standing time determination unit 110 determines that an elapsed time tb from when the vehicle 10 is switched into the ignition off state to when the vehicle 10 is switched into the ignition on state is shorter than or equal to a threshold C after the vehicle 10 has been switched from the ignition off state to the ignition on state, control over the electric oil pump 32 is changed to normal control. When the standing time determination unit 110 determines that the elapsed time tb from when the vehicle 10 is switched into the ignition off state to when the vehicle 10 is switched to the ignition on state exceeds the threshold C, the EOP start determination unit 106 reads the information stored in the EOP information storage unit 105. When the EOP start determination unit 106 determines that it is required to start the electric oil pump 32, the EOP start determination unit 106 sets the EOP required flag, and the EOP control unit 114 starts the electric oil pump 32. When the EOP start determination unit 106 determines that it is not required to start the electric oil pump 32, the EOP control unit 114 executes normal control.

Figure 11:
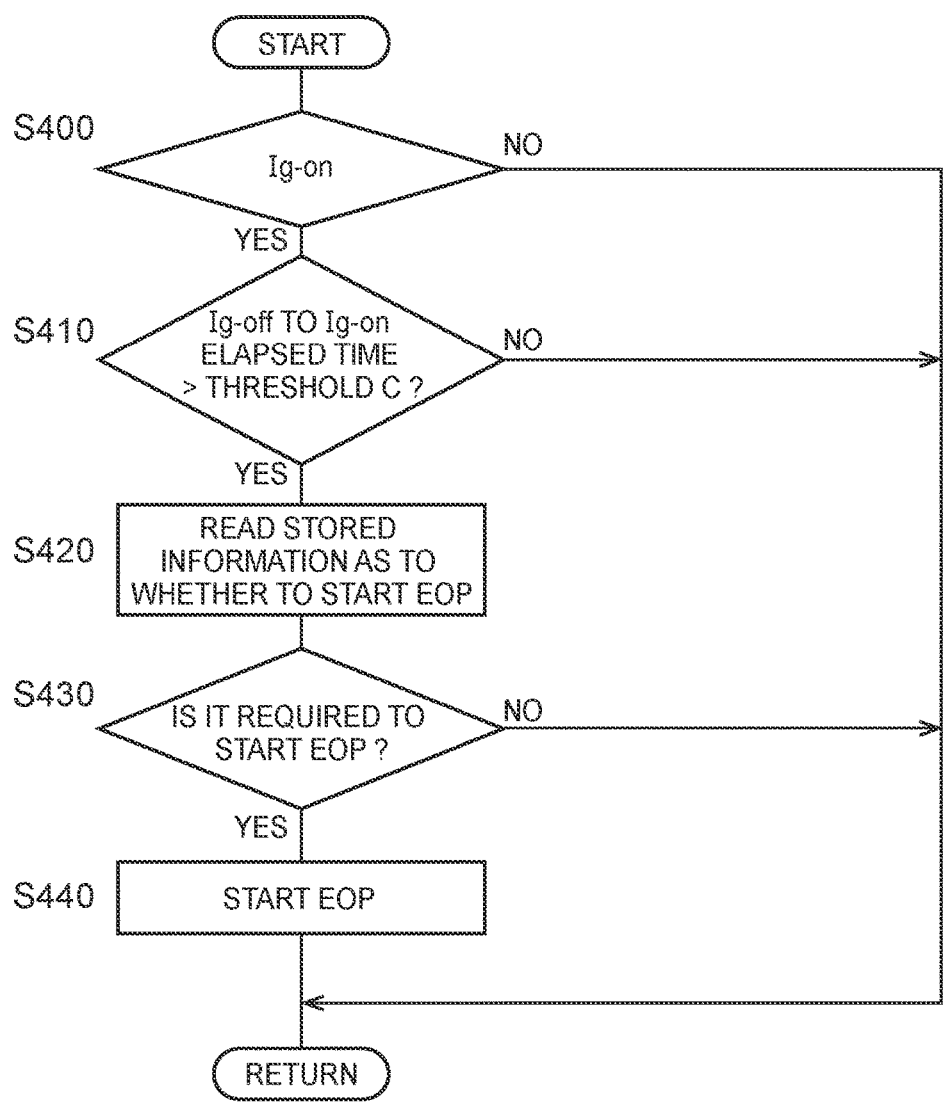
FIG. 11 is a view that shows a relevant portion of control operations to which a fifth embodiment of the disclosure is applied, that is, control operations for determining whether to execute control operations for reading a vehicle load and starting the electric oil pump on the basis of an elapsed time from when the vehicle is switched to the ignition off state to when the vehicle is switched to the ignition on state after the vehicle has been switched to the ignition on state in FIG. 7.

FIG. 11 is a flowchart that illustrates the above-described control operations. This flowchart is repeatedly executed. In FIG. 11, when it is determined in S400 corresponding to the function of the EOP start determination unit 106 that the ignition on signal Ig-on is generated as a result of depressing operation of the power switch 92 when brake operation is performed, it is determined in S410 corresponding to the function of the standing time determination unit 110 whether the elapsed time tb from when the vehicle 10 is switched into the ignition off state to when the vehicle 10 is switched into the ignition on state exceeds the threshold C. When negative determination is made in S410, control over the electric oil pump 32 is changed to normal control. When affirmative determination is made in S410, the determined information stored in the load threshold determination unit 104 at the time when the vehicle 10 has been switched into the ignition off state last time is read in S420 corresponding to the function of the EOP start determination unit 106. When it is determined in S430 corresponding to the function of the EOP start determination unit 106 that it is not required to start the electric oil pump 32 on the basis of the determined information, control over the electric oil pump 32 is changed to normal control. When it is determined that it is required to start the electric oil pump 32 on the basis of the determined information, the electric oil pump 32 is started in S440 corresponding to the function of the EOP control unit 114.

According to the present embodiment, as in the case of the first embodiment, when the vehicle load Td before the vehicle is switched from the ignition on state to the ignition off state last time is smaller than or equal to the threshold A, the operation of the electric oil pump 32 is stopped, and the one-motor EV mode is selected. Therefore, unnecessary operation of the electric oil pump 32 is reduced. As a result, it is possible to suppress a decrease in durability due to an increase in the number of times of operation and operating time of the electric oil pump 32. When the vehicle load Td exceeds the threshold A, it is allowed to immediately change the drive mode into the two-motor EV mode by starting the electric oil pump 32, a time that is taken until the required torque Td is satisfied is shortened in comparison with the case where the electric oil pump 32 is not started at the time when the vehicle 10 is switched into the ignition on state. As a result, it is possible to improve the response of the start of the vehicle, which may make the driver experience a feeling of strangeness. According to the present embodiment, when the elapsed time tb from when the vehicle 10 is switched into the ignition off state to when the vehicle 10 is switched into the ignition on state is short, it is possible to immediately start the electric oil pump 32 even in the case where the two-motor drive request is issued. For this reason, even when the vehicle load Td before the vehicle 10 is switched from the ignition on state to the ignition off state is large, unnecessary operation of the electric oil pump 32 is reduced by stopping the start of the electric oil pump 32. It is possible to further suppress a decrease in durability due to an increase in the number of times of operation and operating time of the electric oil pump 32.

Next, a sixth embodiment of the disclosure will be described. In the following description, like reference numerals denote portions common to those in the above-described embodiments, and the description thereof is omitted.

The present embodiment provides control operations obtained by adding the control operations for stopping the start of the electric oil pump 32 until the two-motor drive request is issued when no two-motor drive request is issued within the predetermined time ta after the electric oil pump 32 has been started according to the second embodiment to the control operations according to the fifth embodiment.

Figure 12:
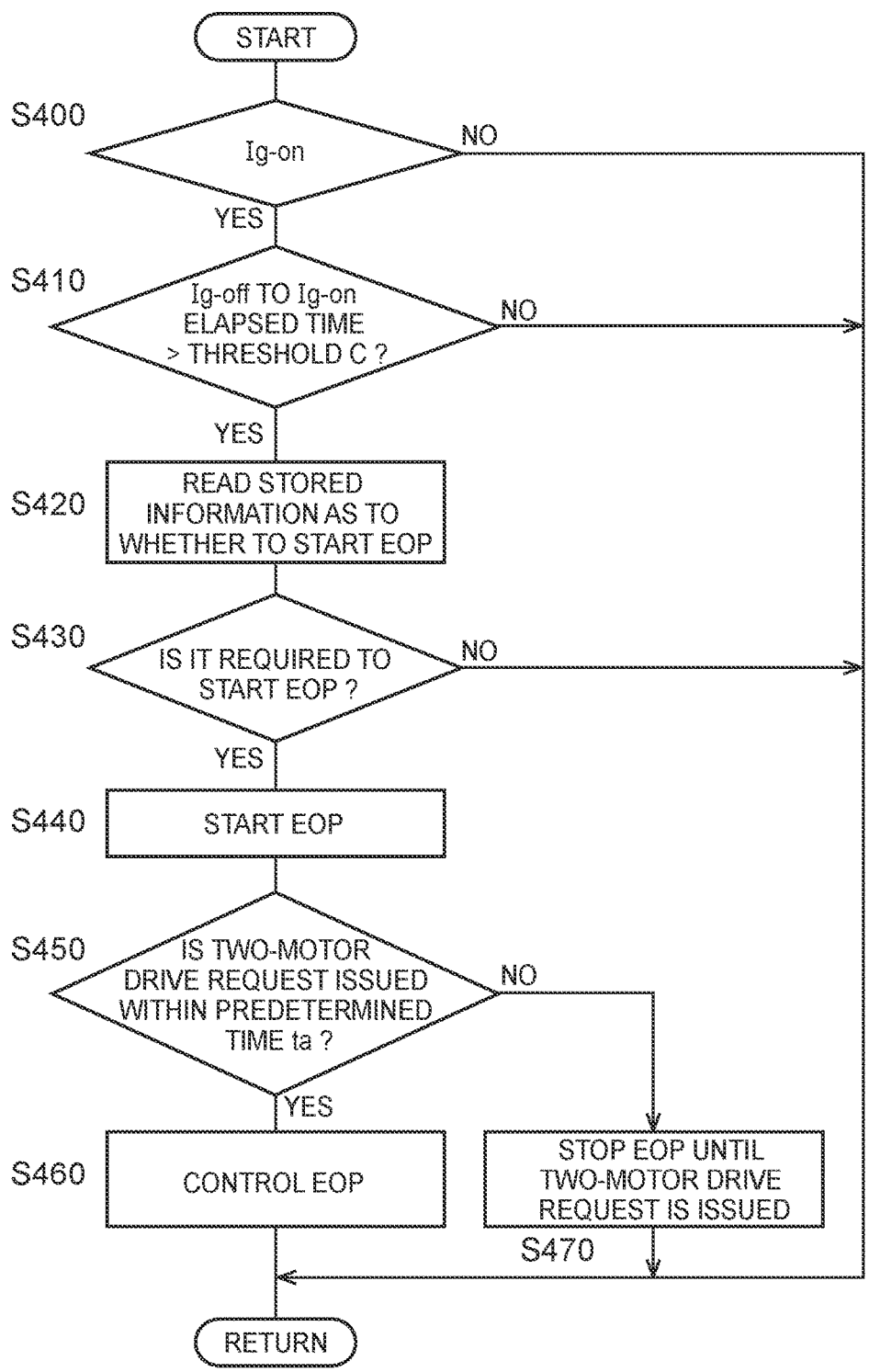
FIG. 12 is a flowchart that shows a relevant portion of control operations to which a sixth embodiment of the disclosure is applied, that is, control operations for stopping the driving of the electric oil pump unless a two-motor drive request is issued after the control operations shown in FIG. 11.

FIG. 12 is a flowchart that illustrates the above-described control operations. This flowchart is repeatedly executed. In FIG. 12, S400 corresponding to the function of the EOP start determination unit 106 to S440 corresponding to the function of the EOP control unit 114 are the same as those of FIG. 11 that shows the fifth embodiment, so the description thereof is omitted. In S450 corresponding to the function of the request time determination unit 113 surrounded by the dashed line in FIG. 2, it is determined whether the two-motor drive request is issued within the predetermined time ta after the electric oil pump 32 has been started. When affirmative determination is made in S450, the driving of the electric oil pump 32 is continued in S460 corresponding to the function of the EOP control unit 114. When negative determination is made in S450, the driving of the electric oil pump 32 is stopped in S470 corresponding to the function of the EOP control unit 114 until the two-motor drive request is issued.

According to the present embodiment, as in the case of the fifth embodiment, when the vehicle load Td before the vehicle 10 is switched from the ignition on state to the ignition off state last time is smaller than or equal to the threshold A, the operation of the electric oil pump 32 is stopped, and the one-motor EV mode is selected. Thus, unnecessary operation of the electric oil pump 32 is reduced. As a result, it is possible to suppress a decrease in durability due to an increase in the number of times of operation and operating time of the electric oil pump 32. When the vehicle load Td exceeds the threshold A, it is allowed to immediately change the drive mode into the two-motor EV mode by starting the electric oil pump 32, a time that is taken until the required torque Td is satisfied is shortened in comparison with the case where the electric oil pump 32 is not started at the time when the vehicle 10 is switched into the ignition on state. As a result, it is possible to improve the response of the start of the vehicle, which may make the driver experience a feeling of strangeness. In addition, when the elapsed time tb from when the vehicle 10 is switched into the ignition off state to when the vehicle 10 is switched into the ignition on state is short, it is possible to immediately start the electric oil pump 32 even in the case where the two-motor request is issued. For this reason, even when the vehicle load Td before the vehicle 10 is switched from the ignition on state to the ignition off state is large, unnecessary operation of the electric oil pump 32 is reduced by stopping the start of the electric oil pump 32. As a result, it is possible to further suppress a decrease in durability due to an increase in the number of times of operation and operating time of the electric oil pump 32. According to the present embodiment, when it is not required to start the electric oil pump 32 within the predetermined time ta, the driving of the electric oil pump 32 is stopped. As a result, it is possible to reduce the electric power consumption of the electric oil pump 32.

Next, a seventh embodiment of the disclosure will be described. In the following description, like reference numerals denote portions common to those in the above-described embodiments, and the description thereof is omitted.

The present embodiment provides control operations obtained by adding the control operations for stopping the start of the electric oil pump 32 until the oil temperature Toil exceeds the threshold B in the third embodiment to the control operations for determining that it is not required to start the electric oil pump 32 when the elapsed time tb from when the vehicle 10 is switched into the ignition off state to when the vehicle 10 is switched into the ignition on state is shorter than or equal to the threshold C in the fifth embodiment.

Figure 13:
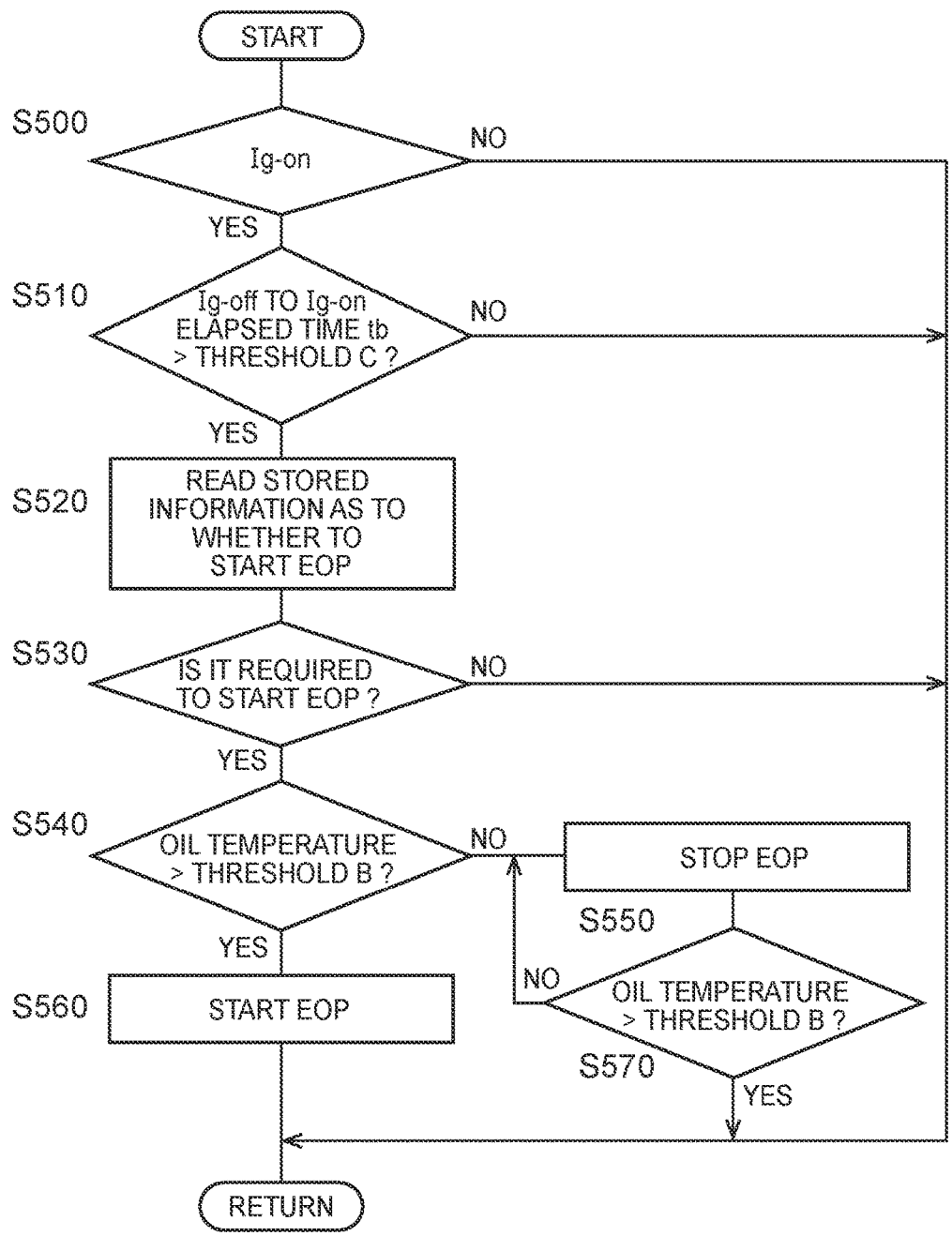
FIG. 13 is a flowchart that shows a relevant portion of control operations to which a seventh embodiment of the disclosure is applied, that is, control operations for determining whether to start the electric oil pump on the basis of an oil temperature after the control operations shown in FIG. 11.

FIG. 13 is a flowchart that illustrates the above-described control operations. This flowchart is repeatedly executed. In FIG. 13, S500 corresponding to the function of the EOP start determination unit 106 to S530 corresponding to the function of the EOP start determination unit 106 are the same as those of FIG. 11 that shows the fifth embodiment. S500 to S530 respectively correspond to S400 to S430 of FIG. 11. In FIG. 13, S540 corresponding to the function of the oil temperature determination unit 108 to S560 corresponding to the function of the EOP control unit 114 and S570 corresponding to the function of the oil temperature determination unit 108 respectively correspond to S330 to S360 of FIG. 9 that shows the third embodiment, so the description thereof is omitted.

According to the present embodiment, as in the case of the fifth embodiment, when the vehicle load Td before the vehicle is switched from the ignition on state to the ignition off state last time is smaller than or equal to the threshold A, the operation of the electric oil pump 32 is stopped, and the one-motor EV mode is selected. Thus, unnecessary operation of the electric oil pump 32 is reduced. As a result, it is possible to suppress a decrease in durability due to an increase in the number of times of operation and operating time of the electric oil pump 32. When the vehicle load Td exceeds the threshold A, it is allowed to immediately change the drive mode into the two-motor EV mode by starting the electric oil pump 32, a time that is taken until the required torque Td is satisfied is shortened in comparison with the case where the electric oil pump 32 is not started at the time when the vehicle 10 is switched into the ignition on state. As a result, it is possible to improve the response of the start of the vehicle, which may make the driver experience a feeling of strangeness. In addition, when the elapsed time tb from when the vehicle 10 is switched into the ignition off state to when the vehicle 10 is switched into the ignition on state is short, it is possible to immediately start the electric oil pump 32 even in the case where the two-motor request is issued. For this reason, even when the vehicle load Td before the vehicle 10 is switched from the ignition on state to the ignition off state is large, unnecessary operation of the electric oil pump 32 is reduced by stopping the start of the electric oil pump 32. It is possible to further suppress a decrease in durability due to an increase in the number of times of operation and operating time of the electric oil pump 32. Furthermore, according to the present embodiment, it is possible to suppress the degradation of the electric oil pump by driving the electric oil pump 32 in a state where the oil temperature Toil exceeds the threshold B, that is, the viscosity of oil is low.

Next, an eighth embodiment of the disclosure will be described. In the following description, like reference numerals denote portions common to those in the above-described embodiments, and the description thereof is omitted.

The present embodiment provides control operations obtained by further adding the control operations for stopping the start of the electric oil pump 32 until the two-motor drive request is issued when the two-motor drive request is not issued within the predetermined time ta after the electric oil pump 32 has been started according to the second embodiment to the control operations obtained by adding the control operations for stopping the start of the electric oil pump 32 until the oil temperature Toil exceeds the threshold B to the control operations for determining that it is not required to start the electric oil pump 32 when the elapsed time tb from when the vehicle 10 is switched into the ignition off state to when the vehicle 10 is switched into the ignition on state is shorter than or equal to the threshold C in the seventh embodiment.

Figure 14:
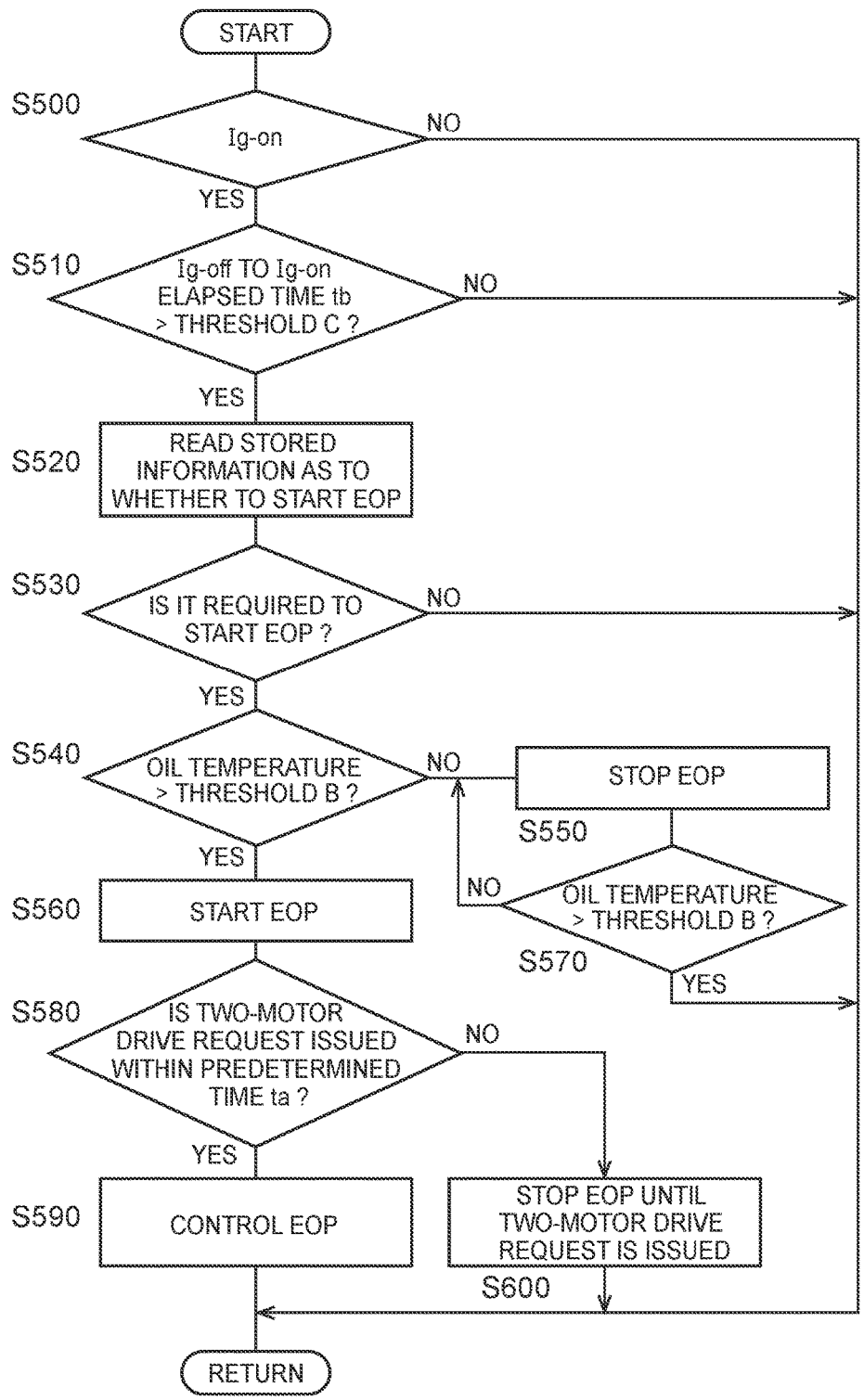
FIG. 14 is a flowchart that shows a relevant portion of control operations to which an eighth embodiment of the disclosure is applied, that is, control operations for stopping the driving of the electric oil pump unless a two-motor drive request is issued after the control operations shown in FIG. 13.

FIG. 14 is a flowchart that illustrates the above-described control operations. This flowchart is repeatedly executed. In FIG. 14, S500 corresponding to the function of the EOP start determination unit 106 to S570 corresponding to the function of the oil temperature determination unit 108 are the same as those of FIG. 13 that shows the seventh embodiment. In addition, S580 corresponding to the function of the request time determination unit 113 to S600 corresponding to the function of the EOP control unit 114 respectively correspond to S240 to S260 of FIG. 8 that shows the second embodiment, so the description thereof is omitted.

According to the present embodiment, as in the case of the seventh embodiment, when the vehicle load Td before the vehicle 10 is switched from the ignition on state to the ignition off state last time is smaller than or equal to the threshold A, the operation of the electric oil pump 32 is stopped. Thus, unnecessary operation of the electric oil pump 32 is reduced by selecting the one-motor EV mode. As a result, it is possible to suppress a decrease in durability due to an increase in the number of times of operation and operating time of the electric oil pump 32. When the vehicle load Td exceeds the threshold A, it is allowed to immediately change the drive mode into the two-motor EV mode by starting the electric oil pump 32, a time that is taken until the required torque Td is satisfied is shortened in comparison with the case where the electric oil pump 32 is not started at the time when the vehicle 10 is switched into the ignition on state. As a result, it is possible to improve the response of the start of the vehicle, which may make the driver experience a feeling of strangeness. In addition, when the elapsed time tb from when the vehicle 10 is switched into the ignition off state to when the vehicle 10 is switched into the ignition on state is short, it is possible to immediately start the electric oil pump 32 even in the case where the two-motor request is issued. For this reason, even when the vehicle load Td before the vehicle 10 is switched from the ignition on state to the ignition off state is large, the start of the electric oil pump 32 is stopped. Thus, unnecessary operation of the electric oil pump 32 is reduced. As a result, it is possible to further suppress a decrease in durability due to an increase in the number of times of operation and operating time of the electric oil pump 32. In addition, it is possible to suppress the degradation of the electric oil pump by driving the electric oil pump 32 in a state where the oil temperature Toil exceeds the threshold B, that is, the viscosity of oil is low. According to the present embodiment, when it is not required to start the electric oil pump 32 within the predetermined time ta, the driving of the electric oil pump 32 is stopped. As a result, it is possible to reduce the electric power consumption of the electric oil pump 32.

The above-described embodiments are only illustrative. The disclosure may be implemented in modes including various modifications or improvements on the basis of the knowledge of persons skilled in the art.

A first aspect of the disclosure is a vehicle. The vehicle includes a driving force source, a mechanical oil pump, an electric oil pump and an electronic control unit. The driving force source includes at least one electric motor. The electronic control unit is configured to select any one of a first drive mode and a second drive. The first drive mode and the second drive mode of the vehicle are modes that use the at least one electric motor. The second drive mode is a mode in which a driving force that is output from the at least one electric motor is larger than the driving force in the first drive mode. The electronic control unit is configured to detect a vehicle load at the time when the vehicle is traveling. The electronic control unit is configured to operate the electric oil pump and select the second drive mode when the electronic control unit determines that the vehicle load is larger than a predetermined value and determines that the vehicle has been switched from an ignition off state to an ignition on state.

With this configuration, the electric oil pump is operated and the second drive mode is selected when the electronic control unit determines that the vehicle load is larger than the predetermined value and determines that the vehicle is switched from the ignition on state to the ignition off state last time. Thus, when the vehicle load is smaller than or equal to the predetermined value, the operation of the electric oil pump is stopped and the low-power first drive mode is selected at the time when the vehicle is switched into the ignition on state this time, so unnecessary operation of the electric oil pump is reduced. As a result, it is possible to suppress a decrease in durability due to an increase in the number of times of operation and operating time of the electric oil pump.

In the vehicle, the electronic control unit may be configured to detect the vehicle load in the ignition on state before the vehicle is switched from the ignition on state to the ignition off state.

With this configuration, it is possible to appropriately estimate the vehicle load just after startup of the vehicle by detecting the vehicle load at the time when the vehicle is switched into the ignition off state. For this reason, unnecessary operation of the electric oil pump is reduced, so it is possible to suppress a decrease in durability due to an increase in the number of times of operation and operating time of the electric oil pump.

In the vehicle, the electronic control unit may be configured to detect at least one of a gradient of the vehicle, a shipping weight of the vehicle and a towing load of the vehicle.

With this configuration, the electronic control unit is able to appropriately detect the vehicle load by detecting at least one of the gradient of the vehicle, the shipping weight of the vehicle and the towing load of the vehicle.

In the vehicle, the driving force source may include two or more of the electric motors. The second drive mode may be a mode in which the number of the electric motors to be driven is larger than the number of the electric motors to be driven in the first drive mode.

With this configuration, two or more of the electric motors are provided, and the number of the electric motors to be driven in the second drive mode is larger than the number of the electric motors to be driven in the first drive mode, so it is possible to effectively increase the driving force in the second drive mode in which the vehicle load is larger.

In the vehicle, the vehicle may further include an engine as the driving force source and a lock mechanism that blocks the rotation of an output shaft of the engine in a reverse direction. The vehicle may be a hybrid vehicle.

With this configuration, it is possible to increase a traveling time using the at least one electric motor during traveling of the hybrid vehicle. It is possible to improve fuel consumption by increasing the traveling time during which the engine is not used.

In the vehicle, the electronic control unit may be configured to stop the electric oil pump until request for two-motor drive control is issued when no request for two-motor drive control is issued within a predetermined time and the electronic control unit determines that the electric oil pump is operated. The two-motor drive control may be control for simultaneously driving two or more of the electric motors.

With this configuration, even when the electric oil pump is operated due to the fact that the vehicle load is large, but when no request to simultaneously drive two or more of the electric motors is issued, the electric oil pump is stopped. Thus, unnecessary operation of the electric oil pump is reduced, so it is possible to improve fuel consumption.

In the vehicle, the electronic control unit may be configured to operate the electric oil pump when an elapsed time exceeds a predetermined time. The elapsed time may be a time from when the vehicle is switched into the ignition off state to the ignition on state.

With this configuration, when the elapsed time from when the vehicle is switched into the ignition off state to when the vehicle is switched into the ignition on state is shorter than or equal to the predetermined time, the elapsed time is short, so no shortage of supply of hydraulic oil occurs. For this reason, it is possible to immediately start the operation of the electric oil pump where necessary, so it is not required to immediately operate the electric oil pump just after the vehicle is switched into the ignition on state. Thus, unnecessary operation of the electric oil pump is reduced. As a result, it is possible to further effectively suppress a decrease in durability due to an increase in the number of times of operation and operating time of the electric oil pump. In addition, it is possible to improve fuel consumption since unnecessary operation of the electric oil pump is reduced.

In the vehicle, the electronic control unit may be configured to operate the electric oil pump when an oil temperature of hydraulic oil exceeds a predetermined value. The hydraulic oil may be used for the electric oil pump.

With this configuration, when the oil temperature of the hydraulic oil that is used for the electric oil pump exceeds the predetermined value, the electric oil pump is operated. Thus, it is possible to suppress a decrease in the durability of the electric oil pump, which may occur when the oil temperature is lower than or equal to a certain temperature.

A second aspect of the disclosure is a control method for a vehicle. The vehicle includes a driving force source, a mechanical oil pump, an electric oil pump and an electronic control unit. The driving force source includes at least one electric motor. The control method includes: selecting, by the electronic control unit, any one of a first drive mode and a second drive mode; detecting, by the electronic control unit, a vehicle load at the time when the vehicle is traveling; and, operating, by the electronic control unit, the electric oil pump and selecting, by the electronic control unit, the second drive mode when the electronic control unit determines that the vehicle load is larger than a predetermined value and determines that the vehicle has been switched from an ignition off state to an ignition on state. The first drive mode and the second drive mode of the vehicle are modes that use the at least one electric motor. The second drive mode is a mode in which a driving force that is output from the at least one electric motor is larger than the driving force in the first drive mode.

With this configuration, when the vehicle load is larger than the predetermined value at the time when the vehicle is switched from the ignition on state to the ignition off state last time, the electric oil pump is operated, and the second drive mode is selected. Thus, when the vehicle load is smaller than or equal to the predetermined value, the operation of the electric oil pump is stopped and the low-power first drive mode is selected at the time when the vehicle is switched into the ignition on state this time, so unnecessary operation of the electric oil pump is reduced. As a result, it is possible to suppress a decrease in durability due to an increase in the number of times of operation and operating time of the electric oil pump.

What is claimed is:

1. A vehicle comprising:
    a driving force source including at least one electric motor;
    a mechanical oil pump;
    an electric oil pump; and
    an electronic control unit configured to select any one of a first drive mode and a second drive mode, the first drive mode and the second drive mode of the vehicle being modes that use the at least one electric motor,
    the second drive mode being a mode in which a driving force that is output from the at least one electric motor is larger than the driving force in the first drive mode,
    the electronic control unit being configured to detect a vehicle load at the time when the vehicle is traveling, and
    the electronic control unit being configured to operate the electric oil pump and select the second drive mode when the electronic control unit determines that the vehicle load is larger than a predetermined value and determines that the vehicle has been switched from an ignition off state to an ignition on state.

2. The vehicle according to claim 1, wherein the electronic control unit is configured to detect the vehicle load in the ignition on state before switching from the ignition on state to the ignition off state.

3. The vehicle according to claim 1, wherein the electronic control unit is configured to detect at least one of a gradient of the vehicle, a shipping weight of the vehicle and a towing load of the vehicle.

4. The vehicle according to claim 1, wherein the driving force source includes two or more of the electric motors, and the second drive mode is a mode in which the number of the electric motors to be driven is larger than the number of the electric motors to be driven in the first drive mode.

5. The vehicle according to claim 4, further comprising:
    an engine that serves as the driving force source; and
    a lock mechanism that blocks rotation of an output shaft of the engine in a reverse direction, wherein the vehicle is a hybrid vehicle.

6. The vehicle according to claim 4, wherein
the electronic control unit is configured to stop the electric oil pump until request for two-motor drive control is issued when no request for two-motor drive control is issued within a predetermined time and the electronic control unit determines that the electric oil pump is operated, and
the two-motor drive control is control for simultaneously driving two or more of the electric motors.

7. The vehicle according to claim 1, wherein
the electronic control unit is configured to operate the electric oil pump when an elapsed time exceeds a predetermined time, the elapsed time is a time from when the vehicle is switched into the ignition off state to the ignition on state.

8. The vehicle according to claim 1, wherein
the electronic control unit is configured to operate the electric oil pump when an oil temperature of hydraulic oil exceeds a predetermined value, the hydraulic oil is used for the electric oil pump.

9. A control method for a vehicle, the vehicle including a driving force source, a mechanical oil pump, an electric oil pump and an electronic control unit, the driving force source including at least one electric motor, the control method comprising:

selecting, by the electronic control unit, any one of a first drive mode and a second drive mode, the first drive mode and the second drive mode of the vehicle being modes that use the at least one electric motor;

detecting, by the electronic control unit, a vehicle load at the time when the vehicle is traveling; and operating, by the electronic control unit, the electric oil pump and selecting, by the electronic control unit, the second drive mode when the electronic control unit determines that the vehicle load is larger than a predetermined value and determines that the vehicle has been switched from an ignition off state to an ignition on state, the second drive mode being a mode in which a driving force that is output from the at least one electric motor is larger than the driving force in the first drive mode.

* * * * *

UNITED STATES PATENT AND TRADEMARK OFFICE
CERTIFICATE OF CORRECTION

PATENT NO. : 10,138,770 B2
APPLICATION NO. : 15/634709
DATED : November 27, 2018
INVENTOR(S) : Masami Yamahata et al.

Page 1 of 1

It is certified that error appears in the above-identified patent and that said Letters Patent is hereby corrected as shown below:

In the Specification

In Column 19, Line 13, delete "time to" and insert --time ta--, therefor.

Signed and Sealed this
Nineteenth Day of March, 2019

Andrei Iancu
*Director of the United States Patent and Trademark Office*